(12) United States Patent
Behr et al.

(10) Patent No.: US 11,447,250 B2
(45) Date of Patent: Sep. 20, 2022

(54) OPTIMIZED CONFIGURATION FOR LOWER LOBE PASSENGER REST CABINS

(71) Applicant: Rockwell Collins, Inc., Cedar Rapids, IA (US)

(72) Inventors: Nicolas Behr, Kirkland, WA (US); Trevor Skelly, Mercer Island, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 206 days.

(21) Appl. No.: 16/127,119

(22) Filed: Sep. 10, 2018

(65) Prior Publication Data
US 2020/0180765 A1   Jun. 11, 2020

Related U.S. Application Data

(60) Provisional application No. 62/729,237, filed on Sep. 10, 2018.

(51) Int. Cl.
*B64D 11/00* (2006.01)
*B64C 1/18* (2006.01)
*B64C 1/00* (2006.01)

(52) U.S. Cl.
CPC ............... *B64D 11/00* (2013.01); *B64C 1/18* (2013.01); *B64C 2001/0027* (2013.01); *B64D 2011/0046* (2013.01); *B64D 2011/0084* (2013.01)

(58) Field of Classification Search
CPC ........... B64D 11/00; B64D 2011/0046; B64D 2011/0084; B64D 2011/0076; B64C 1/18; B64C 2001/0027
See application file for complete search history.

(56) References Cited

U.S. PATENT DOCUMENTS

| | | | |
|---|---|---|---|
| 1,867,904 A | 7/1932 | Bessler |
| 2,455,157 A | 11/1948 | Bigelow |
| 3,044,419 A | 7/1962 | Majnoni |
| 3,144,224 A | 8/1964 | Carroll |

(Continued)

FOREIGN PATENT DOCUMENTS

| | | | |
|---|---|---|---|
| CN | 101945776 A | 1/2011 |
| CN | 107000845 A | 8/2017 |

(Continued)

OTHER PUBLICATIONS

Meyer, David, "Airbus Has a Solution to 17-Hour Flight Hell: Beds in the Cargo Hold", Fortune, Apr. 11, 2018, 2 pages, http://fortune.com/2018/04/11/airbus-zodiac-sleep-cargo-hold/.

(Continued)

*Primary Examiner* — Medhat Badawi
*Assistant Examiner* — Vicente Rodriguez
(74) *Attorney, Agent, or Firm* — Suiter Swantz pc llo

(57) ABSTRACT

A modular lower lobe passenger rest cabin includes passenger rest compartments oriented longitudinally along the roll axis and laterally along the pitch axis. Partial passenger rest compartments are defined by the modular lower lobe passenger rest cabin such that when two modular lower lobe passenger rest cabins are installed in a cargo deck of an aircraft, the partial passenger rest compartments define a single passenger rest compartment or aisle from space that would otherwise be insufficient for the purpose.

20 Claims, 15 Drawing Sheets

(56) References Cited

U.S. PATENT DOCUMENTS

| | | | |
|---|---|---|---|
| 5,496,000 A * | 3/1996 | Mueller | B64D 11/0007 104/88.01 |
| 5,651,733 A | 7/1997 | Schumacher | |
| 5,784,836 A * | 7/1998 | Ehrick | B64D 11/00 52/79.8 |
| 6,003,813 A | 12/1999 | Wentland et al. | |
| 6,073,883 A | 6/2000 | Ohlmann et al. | |
| 6,152,400 A | 11/2000 | Sankrithi et al. | |
| 6,182,926 B1 | 2/2001 | Moore | |
| 6,305,645 B1 | 10/2001 | Moore | |
| 6,393,343 B1 | 5/2002 | Frey et al. | |
| 6,464,169 B1 | 10/2002 | Johnson et al. | |
| 6,520,451 B1 | 2/2003 | Moore | |
| 6,616,098 B2 | 9/2003 | Mills | |
| 6,659,225 B2 | 12/2003 | Oliges et al. | |
| 6,772,977 B2 | 8/2004 | Dees et al. | |
| 6,808,142 B2 | 10/2004 | Oki | |
| 6,848,654 B1 | 2/2005 | Mills et al. | |
| 6,932,298 B1 | 8/2005 | Mills | |
| 6,986,485 B2 | 1/2006 | Farnsworth | |
| 7,088,310 B2 | 8/2006 | Sanford | |
| 7,156,344 B1 | 1/2007 | Guering | |
| 7,290,735 B2 | 11/2007 | Saint-Jalmes et al. | |
| 7,354,018 B2 | 4/2008 | Saint-Jalmes | |
| 7,389,959 B2 | 6/2008 | Mills | |
| 7,762,496 B2 | 7/2010 | Seiersen et al. | |
| 7,823,831 B2 | 11/2010 | Guering | |
| 7,878,586 B2 | 2/2011 | Kneller et al. | |
| 7,942,367 B2 | 5/2011 | Saint-Jalmes et al. | |
| 8,152,102 B2 | 4/2012 | Warner et al. | |
| 8,162,258 B2 | 4/2012 | Joannis et al. | |
| 8,328,137 B2 | 12/2012 | Sutthoff et al. | |
| 8,534,602 B2 | 9/2013 | Jakubec et al. | |
| 8,602,354 B2 | 12/2013 | Sutthoff et al. | |
| 8,727,277 B2 | 5/2014 | Guering et al. | |
| 8,794,569 B1 | 8/2014 | Ohlmann et al. | |
| 8,844,865 B2 | 9/2014 | Gehm et al. | |
| 8,881,524 B2 | 11/2014 | Andres et al. | |
| 8,905,633 B2 * | 12/2014 | Popp | A62C 3/08 374/121 |
| 8,991,756 B2 | 3/2015 | Papke | |
| 9,169,021 B2 | 10/2015 | Pozzi et al. | |
| 9,340,294 B1 | 5/2016 | Keleher et al. | |
| 9,403,465 B2 | 8/2016 | Kircher et al. | |
| 9,456,184 B2 | 9/2016 | Barrou et al. | |
| 9,545,998 B2 | 1/2017 | Lin | |
| 9,550,571 B1 | 1/2017 | Ohlmann et al. | |
| 9,706,242 B2 | 7/2017 | Dame et al. | |
| 9,708,065 B2 | 7/2017 | Sankrithi et al. | |
| 2002/0093564 A1 * | 7/2002 | Israel | H04N 7/181 348/145 |
| 2002/0158497 A1 | 10/2002 | Nivet et al. | |
| 2005/0057344 A1 * | 3/2005 | Davis | G08G 1/205 340/425.5 |
| 2005/0178909 A1 | 8/2005 | Mills et al. | |
| 2005/0230542 A1 | 10/2005 | Farnsworth | |
| 2006/0235753 A1 | 10/2006 | Kameyama | |
| 2006/0284013 A1 | 12/2006 | Guering | |
| 2007/0034212 A1 | 2/2007 | Bendley et al. | |
| 2007/0125909 A1 | 6/2007 | Seiersen et al. | |
| 2008/0136230 A1 | 6/2008 | Ling | |
| 2009/0159744 A1 * | 6/2009 | Beentjes | B64D 11/00 244/118.1 |
| 2009/0315726 A1 | 12/2009 | Popp et al. | |
| 2010/0019087 A1 | 1/2010 | Warner et al. | |
| 2010/0140402 A1 | 6/2010 | Jakubec et al. | |
| 2010/0252679 A1 | 10/2010 | Sütthoff et al. | |
| 2010/0301163 A1 | 12/2010 | Guering et al. | |
| 2011/0139930 A1 | 6/2011 | Sütthoff et al. | |
| 2011/0233333 A1 | 9/2011 | Papke | |
| 2011/0253005 A1 | 10/2011 | Sun et al. | |
| 2012/0325962 A1 | 12/2012 | Barron | |
| 2013/0007638 A1 | 1/2013 | Basso et al. | |
| 2013/0120162 A1 * | 5/2013 | Stehman | G08B 5/36 340/945 |
| 2013/0257688 A1 | 10/2013 | Yamazaki et al. | |
| 2014/0160285 A1 | 6/2014 | Barrou et al. | |
| 2014/0222119 A1 | 8/2014 | Pederson et al. | |
| 2014/0298582 A1 | 10/2014 | Kercher et al. | |
| 2015/0048205 A1 | 2/2015 | Seibt et al. | |
| 2015/0266581 A1 * | 9/2015 | Roese | B64D 11/00 244/118.6 |
| 2015/0358574 A1 | 12/2015 | Henion et al. | |
| 2015/0363656 A1 | 12/2015 | Brauer | |
| 2017/0057637 A1 | 3/2017 | Cole | |
| 2017/0094166 A1 | 3/2017 | Riedel | |
| 2017/0094167 A1 | 3/2017 | Riedel | |
| 2017/0098133 A1 | 4/2017 | Brauer | |
| 2017/0137109 A1 * | 5/2017 | Sieben | B64C 1/18 |
| 2017/0233058 A1 | 8/2017 | Brunaux et al. | |
| 2017/0289494 A1 | 10/2017 | Garing et al. | |
| 2018/0056846 A1 | 3/2018 | Nasir | |
| 2018/0265201 A1 | 9/2018 | Carlioz et al. | |

FOREIGN PATENT DOCUMENTS

| | | |
|---|---|---|
| EP | 0901963 A2 | 3/1999 |
| EP | 0913325 B1 | 6/2004 |
| WO | 2019207211 A1 | 10/2019 |

OTHER PUBLICATIONS

International Search Report and Written Opinion dated Dec. 18, 2019 for PCT/US2019/050387.

International Search Report and Written Opinion dated Mar. 24, 2020 for PCT/US2019/050343.

International Search Report and Written Opinion dated Dec. 27, 2019 for PCT/US2019/050357.

International Search Report and Written Opinion dated Mar. 23, 2020 for PCT/US2019/050337.

International Search Report and Written Opinion dated Dec. 13, 2019 for PCTUS2019/050347.

Ong, Thuy, "Emirates' new first class suites feature virtual windows and a 'zero-gravity' seat", The Verge, Dec. 1, 2017, 3 pages, https://www.theverge.com/2017/12/1/16723152/emirates-first-class-suites-virtual-windows-zero-gravity-seat.

U.S. Department of Transportation Federal Aviation Administration, Advisory Circular, "Flightcrew Member Rest Facilities", Sep. 19, 2012, AFS-220, AC 117-1, 9 pages.

Flynn, David, Dec. 27, 2013, https://www.ausbt.com.au/the-best-seats-on-a-cathay-pacific-boeing-777-300er-try-the-upstairs-bunk-beds, 1 page.

Bahrami, Ali, Federal Register, vol. 68, No. 74, Apr. 17, 2003, Rules and Regulations, "Overhead Crew Rest Compartments", pp. 18843-18852.

Bahrami, Ali, Federal Register, vol. 77, No. 62, Mar. 30, 2012, Proposed Rules, "Crew Rest Compartments", pp. 19148-19153.

International Search Report and Written Opinion dated Jan. 17, 2020 for PCT/US2019/050367.

Office Action Received in Chinese Application No. 2021113001348420 dated Dec. 3, 2021, 27 pages (with English Translation).

Office Action for European Application No. 19216230.3 dated Feb. 2, 2022, 7 pages.

Extended Search Report in European Application No. 119861193.1 dated Apr. 8, 2022, 7 pages.

European Search Report in European Application No. 19869624.7 dated Jun. 24, 2022, 8 pages.

Extended Search Report in European Application No. 19859994.6 dated Jun. 1, 2022, 11 pages.

Extended Search Report in European Application No. 19860526.3 dated Jun. 20, 2022, 5 pages.

Extended Search Report in European Application No. 19860996.8 dated May 20, 2022, 17 pages.

Extended Search Report in European Application No. 19888563.4 dated Jun. 7, 2022, 5 pages.

(56) References Cited

OTHER PUBLICATIONS

Office Action and Search Report in Chinese Application No. 201910593696.6 dated May 11, 2022, 20 pages (with English Translation).
Office Action in European Application No. 19216332.7 dated Apr. 11, 2022, 5 pages.
Extended Search Report in European Application No. 19860881.2 dated Jun. 22, 2022, 8 pages.

* cited by examiner

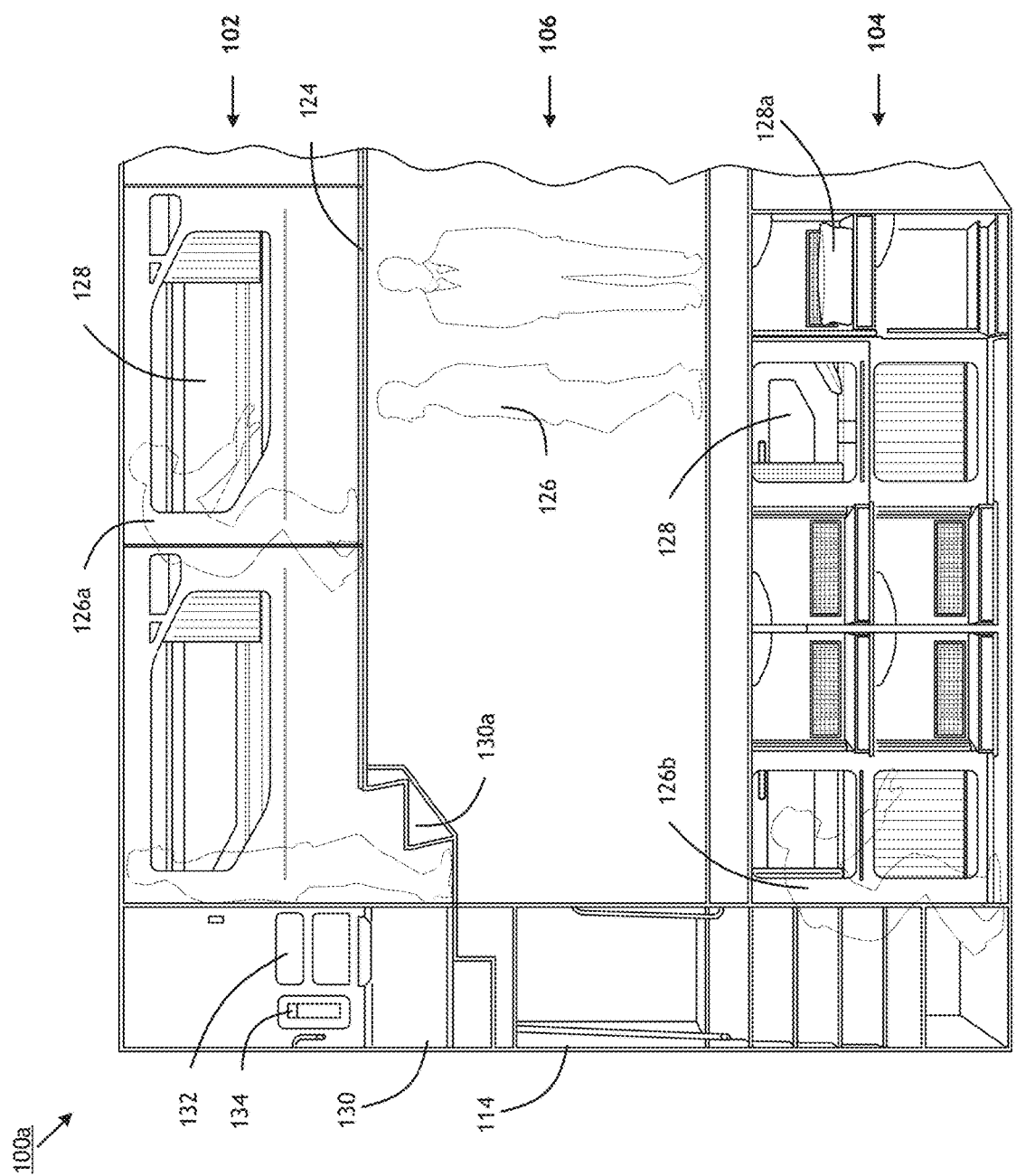

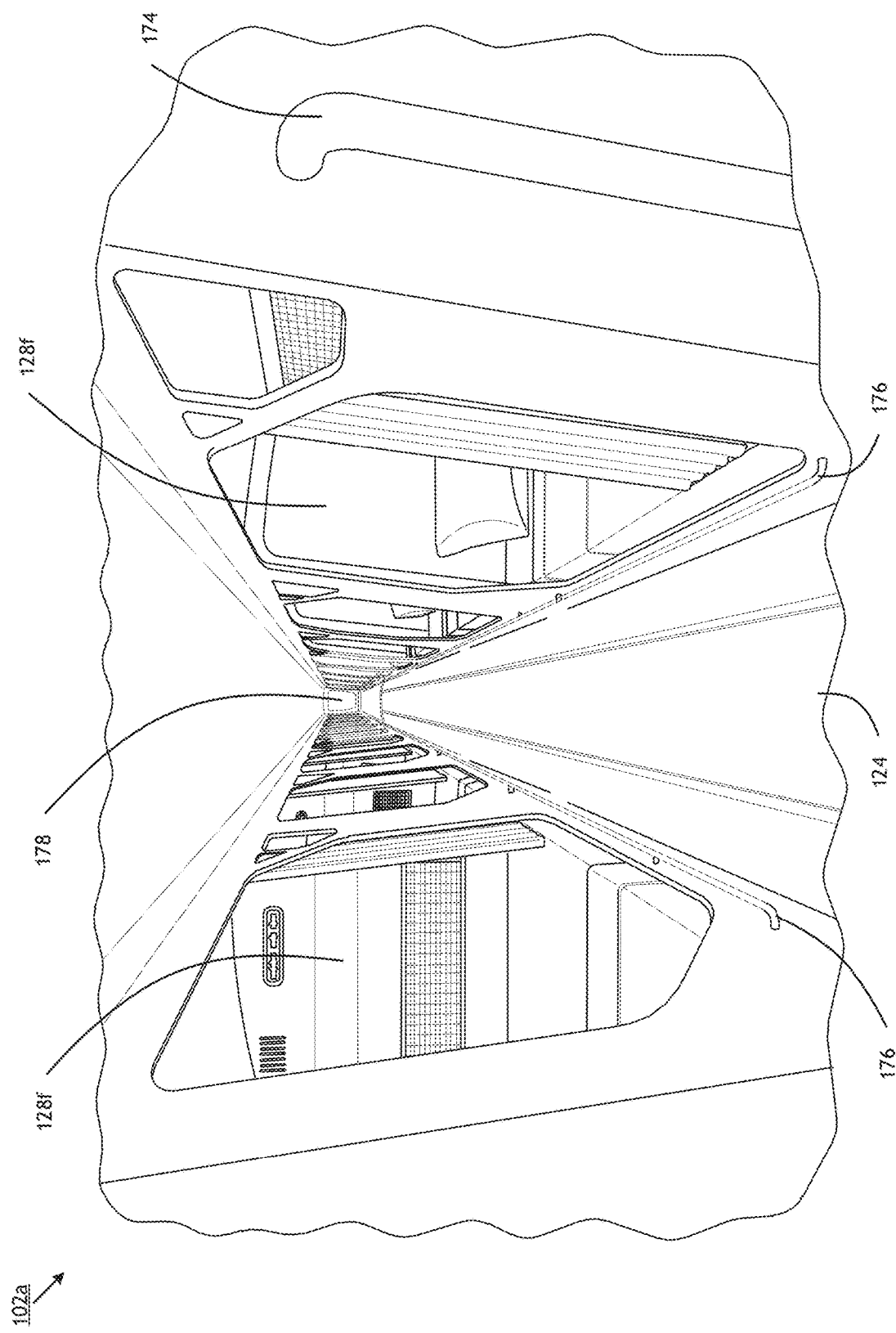

OPTIMIZED CONFIGURATION FOR LOWER LOBE PASSENGER REST CABINS

CROSS-REFERENCE TO RELATED APPLICATIONS

This application claims the benefit under 35 U.S.C. §§ 119 and/or 120 of U.S. Provisional Patent Application Ser. No. 62/729,237, filed Sep. 10, 2018. Said provisional patent application Ser. No. 62/729,237 is herein incorporated by reference in its entirety.

BACKGROUND

Passenger aircraft have incorporated onboard crew rest compartments (CRC) for the short-term use of their pilots or crew. CRCs may include lounge chairs or, more commonly, bunks allowing cabin crew to rest in a lie-flat position when not on duty (e.g., on transoceanic or other long-haul flights requiring multiple shifts). However, CRCs are low-capacity, generally providing no more than six to eight bunks at most. Further, CRCs are generally inaccessible to passengers for security reasons, and may be directly accessible from the cockpit only.

Airlines may wish to provide their economy-class passengers, e.g., those passengers occupying seats in the main passenger cabin as opposed to premium lie-flat convertible seats or enclosed compartments such as partitioned seats or suites, with access to bunk facilities comparable to those provided by a CRC for use on similar long-haul flights. Clearly such compartments must meet regulatory requirements for passenger use (e.g., similarly to CRCs, passenger rest compartments may not be used during taxi, takeoff and landing (TTL) flight segments). As an additional challenge, however, airlines must make passenger rest facilities easily accessible to participating passengers from the main passenger cabin (e.g., when the aircraft has reached a safe cruising altitude and passengers are permitted to enter the rest compartments).

The incorporation of rest cabins for pilots and crew of an aircraft, and occasionally for passengers as well, includes a variety of approaches. For example, U.S. Pat. No. 5,784,836 discloses a removable sleeping compartment assembly that may nest together several different modules incorporating sleeping berths, restroom facilities, and other convenience features. The modules may have an exterior configuration or form factor similar to that of a cargo container. Entry to the sleeping compartments may be achieved by a pivotable staircase or lift system from the main deck. Additionally, U.S. Pat. Nos. 6,182,926; 6,305,645; and 6,520,451 disclose a variety of configurations for a crew rest station contoured to occupy the overhead space between the curved top hull of the aircraft and the lowered ceiling and providing bunk portions, lavatory facilities, and storage space. The crew rest station may be located in the approximate midsection of the aircraft and accessible via an entry ladder, with forward, aft, or side bunk facilities arranged around a central deck. Further, U.S. Pat. No. 8,991,756 discloses a crew rest station including an overhead crew rest portion with forward and aft bunk portions arranged around a central deck portion. The central deck portion includes an emergency escape hatch, a fold-down jump seat, and a fold-down entry door capable of covering a stairway of a central entry vestibule, via which the overhead crew rest portion may be accessed from the passenger seating area.

Such compartments may be required to meet regulatory requirements for crew rest compartments in aircraft as set forth by the Federal Aviation Administration (FAA) of the United States Government. In addition, the passenger rest facilities should easily accessible to participating passengers occupying the premium areas while minimizing added weight and minimizing disruption to the interior space and passenger seating within the premium areas.

SUMMARY

In one aspect, embodiments of the inventive concepts disclosed herein are directed to a modular lower lobe passenger rest cabin designed to fit within the cargo deck of an aircraft, align with a vestibule to access the lower lobe passenger rest cabin from the main passenger cabin, and align with other modular lower lobe passenger rest cabins such that partial passenger rest compartments or partial aisles in each of the modular lower lobe passenger rest cabins combine to form a single passenger rest compartment or aisle.

In a further aspect, embodiments of the inventive concepts disclosed herein include both upper and lower passenger rest compartments, where partial passenger rest compartments only contribute to one of the upper or lower passenger rest compartments such that the upper and lower passenger rest compartments may be linearly offset so that bulkheads separating lower passenger rest compartments partially support the upper passenger rest compartments.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 2 shows a partial cross-section view of the aircraft of FIG. 1;

FIG. 5 shows a partial longitudinal view of an overhead passenger rest cabin of the aircraft of FIG. 1;

DETAILED DESCRIPTION

Figure 1:
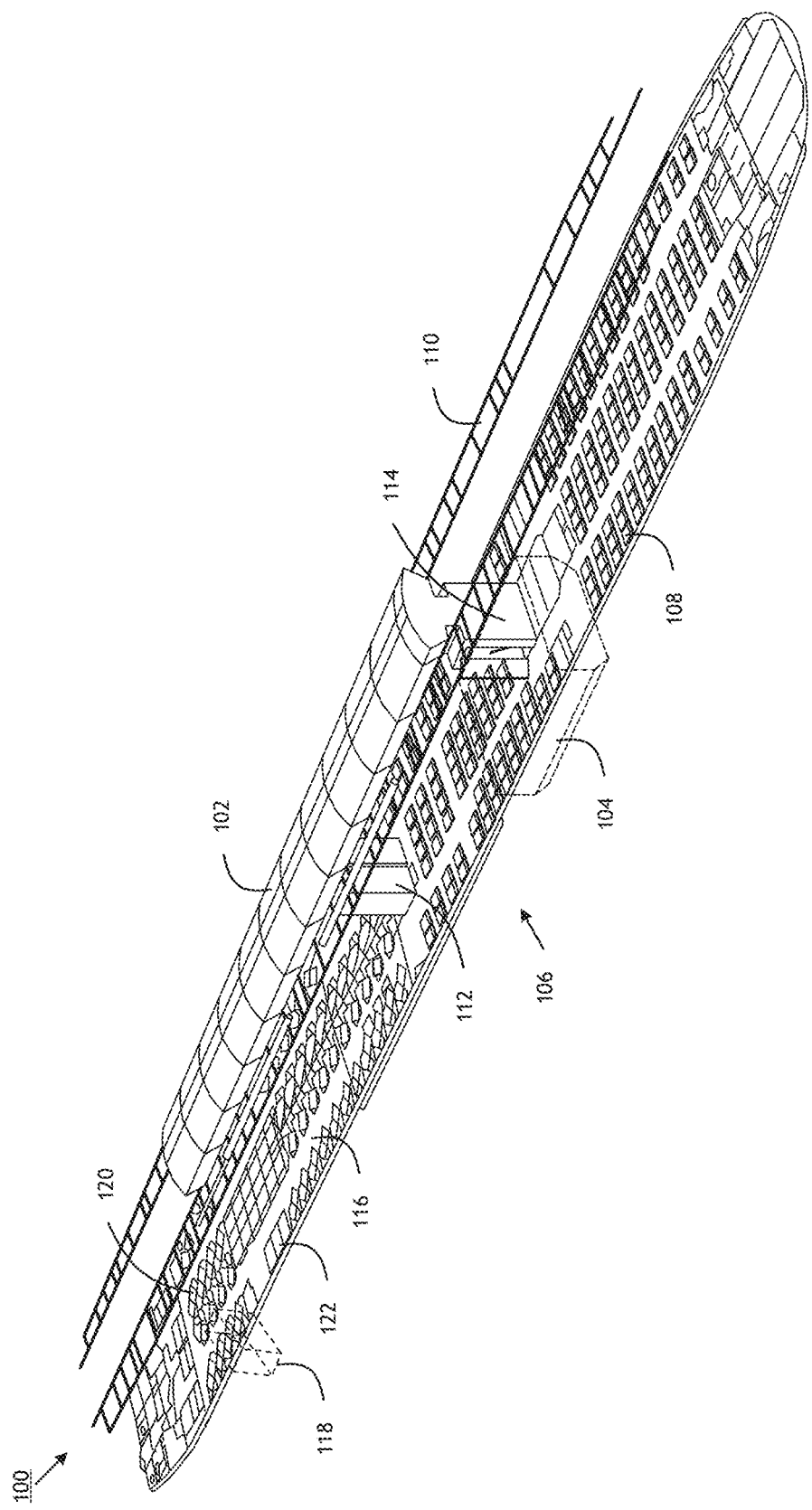
FIG. 1 illustrates an exemplary embodiment of an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger aircraft capable of providing rest compartments for passengers within remote areas of the aircraft. "Remote areas" refers to portions of the aircraft outside the main passenger cabin potentially occupiable by passengers. For example, passenger rest compartments (e.g., berths, bunks) may be incorporated into the overhead crown area of the fuselage, directly above the main passenger cabin. Additionally, or alternatively, rest compartments may be incorporated into a lower lobe area under the main passenger cabin, such as a cargo deck. In either case, passenger rest compartments may be incorporated into a larger cabin structure above or below the main passenger cabin and accessible therefrom by passengers, e.g., when the aircraft reaches a safe cruising altitude. Unlike rest cabins dedicated to use by aircraft pilots and cabin crew, the passenger rest cabins may be accessible from the main passenger cabin rather than isolated therefrom. Similarly, the passenger rest cabins and their individual rest compartments may incorporate additional safety features and amenities developed with passenger use in mind.

It is noted herein that an aircraft including an aircraft suite with an overhead passenger rest cabin and a lower lobe passenger rest cabin may be configured to meet or exceed regulatory requirements for crew rest compartments in aircraft as set forth by the Federal Aviation Administration (FAA) of the United States Government. The regulatory requirements may be codified (e.g., including, but not limited to, regulations codified in 14 C.F.R. 25: Airworthiness Standards: Transport Category Airplanes and 14 C.F.R. 117: Flight and Duty Limitations and Rest Requirements: Flightcrew Members). In addition, the regulatory requirement may include special condition regulations set forth for specific aircraft (e.g., including, but not limited to, regulations such as those found in 68 FR 18843: Special Conditions: Boeing Model 777 Series Airplanes; Overhead Crew Rest Compartments, and 79 FR 2359: Special Condition: Airbus Model A350-900 Series Airplane Crew Rest Compartments). Further, the regulatory requirements may be provided in advisory circulars (e.g., including, but not limited to, Advisory Circular AC117-1).

It is contemplated that passenger rest compartments will not be occupied by passengers during taxi, takeoff and landing (TTL) flight segments. Rather, passengers will occupy their assigned seats in the main passenger cabin during said flight segments. When the aircraft reaches a safe cruising altitude (e.g., when passengers are generally permitted to leave their seats), those passengers having access to a rest compartment may be permitted to access their assigned rest compartment if they so choose. Passenger access to rest compartments may be via a dedicated vestibule adjacent to one or more central aisles (e.g., adjacent to, and accessible via, both aisles of a double-aisle aircraft). Access doors in the vestibule may lead to compact staircases or similar means of ascent or descent by which passengers may reach the overhead or lower-lobe rest cabins. Each remote area of the aircraft wherein rest cabins are incorporated (e.g., the overhead crown area or lower-lobe cargo deck) may have a dedicated ascent/descent device, such that the progress of passengers wishing to ascend into an overhead cabin is not obstructed by that of passengers wishing to descend into the lower lobe area. Rest cabins may incorporate a transitional space or landing between the ascent/descent staircase and the individual bunks, which space may include a station space where flight attendants and crew may access emergency equipment storage (e.g., first aid supplies, fire containment bags) and communications facilities. Alternatively, the transitional space may include temporary seating facilities for an on-site crewmember, proximate to storage and facilities. The transitional space may temporarily accommodate a passenger entering or leaving the rest cabin. It is contemplated that under normal conditions, one or more cabin crewmembers may be dedicated to monitoring the rest cabins inflight; however, said crewmembers may remotely monitor the rest cabin from the main deck (e.g., via the aforementioned sensor system), responding to the rest cabin if their attention is required as described below. A flight attendant/crew station as described above may be positioned at either vertical end of a bidirectional entry vestibule, e.g., at the respective entrances to the overhead passenger rest cabin (at its aft end) and the lower lobe rest cabin. Additional crew stations may be positioned, e.g., at the opposing forward end of the overhead passenger rest cabin and in the portion of the lower lobe rest cabin most distant from the entry station. For example, additional lower lobe rest stations may be positioned at the opposing end of a corridor passing through a single lower lobe rest cabin module, or at the point of transition between two adjacent lower lobe rest cabin modules. In some embodiments, a second entry vestibule may be positioned at the forward or terminal end of the overhead passenger rest cabin, via which passengers and crew may enter or exit the overhead passenger rest cabin.

Each rest cabin may include additional access hatches for the emergency use of passengers or crew. Should the aircraft encounter severe turbulence or other adverse conditions, passengers may be instructed to return to the main passenger cabin and occupy their assigned seats. In some cases, cabin crew may advise those passengers occupying rest compartments to remain there, e.g., until it is determined that passengers may safely return to their seats. Each rest compartment may include a bunk occupiable by a passenger in a prone or reclined position, allowing the passenger to rest or sleep therein. Individual bunks may be arranged within a rest cabin so as to maximize the amount of standard bunks within a rest cabin of a given size (e.g., equivalent in volume to a standard cargo compartment) without truncating the size of any individual bunk. For example, two or more bunks may be stacked atop each other within a rest cabin. Individual bunks may be disposed at a fixed angle to others, e.g., substantially parallel or perpendicular to the longitudinal axis (roll axis) of the aircraft. Alternatively, individual bunks may be arranged longitudinally on either side of a central aisle, by which each bunk may be accessed.

It is contemplated that cabin crew may not be physically present to monitor rest cabins in person, although some rest cabins may be configured to include a seating element temporarily occupyable by a crewmember. The rest cabins may be monitored remotely by cabin crew on the main deck, who may be alerted if conditions therein merit a response. For example, "rough" or low-resolution infrared sensors may monitor the rest cabin and individual compartments without intruding upon the privacy of occupying passengers, while visual cameras may monitor common areas of the rest cabin. Sensors and/or cameras may monitor the presence or absence of passengers, movement, and heat signatures, alerting the cabin crew if conditions warrant. If, for example, conditions consistent with an unauthorized presence (e.g., a passenger is present within a rest cabin or rest compartment when s/he should not be), an altercation between passengers, adverse environmental conditions, a medical emergency (e.g., as determined by anomalous movement of a given passenger over time), or a potential fire (e.g., excessive heat persisting over time) are detected, the crew may be alerted or summoned to the rest cabin depending upon the severity of the scenario. Rest cabins may incorporate preventative safety measures in order to prevent or reduce the risk of such emergency scenarios. For example, as the charging of mobile devices (in particular, the rechargeable batteries of cellular phones or tablets) may contribute to the risk of onboard fire, charging devices (e.g., inductive wireless charging devices) may be provided for passengers occupying the rest cabin within a fireproof enclosure, such that a device may not be charged unless placed therein. Such fireproof charging facilities may be placed proximate to an infrared sensor for added safety. Similarly, portable fire containment bags (FCB) will be securely stored throughout the overhead and lower lobe rest cabins for the containment of any mobile devices or batteries thereof determined to be at risk of combustion. Infrared temperature sensors may further be positioned to cover the whole of the common area (e.g., shared spaces or common access corridors). The temperature sensors, in concert with onboard smoke detectors, may determine not only the presence of a fire, but its location, such that cabin crew may respond quickly and passengers evacuated to the main cabin by unobstructed routes.

Each bunk may incorporate a privacy partition and may be equipped with safety features comparable to a main-deck seat, such as a safety belt and deployable oxygen mask, as well as a passenger service unit (PSU) incorporating a positionable reading light, call button, panic button, and adjustable gasper outlet. Each rest compartment may further include a two-way audio connection so that the occupant may communicate with cabin crew. Rest compartments may incorporate work surfaces that fold out or down into the compartment from the wall or ceiling for the temporary use of occupants. As individual rest compartments may lack a physical window, the compartments may incorporate a "virtual window", whereby a display surface connected to exterior cameras or image sensors provides attitude cues to the occupant via externally captured images. The display surface may be embedded into the compartment wall or pivotably attached, such that a single display surface may serve as a virtual window while substantially flush with the wall but may be pivoted out or down for access to the inflight entertainment system.

A passenger rest cabin incorporated into the overhead crown area may be modular (e.g., comprising one or more connected or linked modules), such that the size of the rest cabin may be scaled up or down depending on the size of the embodying aircraft or the desired number of rest compartments. Similarly, one or more modular overhead rest compartments may be easily installed into the aircraft during an outfit or refit, with portions of the modular overhead passenger rest cabins dedicated to electrical, ventilation, or other service connections between modules. The overhead passenger rest cabin may be proportioned to maximize the available space for individual rest compartments and access corridors while minimally intruding upon the space of main cabin passengers. For example, in order to maximize the height of the overhead cabin access corridor, the main cabin ceiling may be lowered, e.g., over the centermost seats. Similarly, main cabin lavatories may be "notched", or partially reduced in height or truncated, to accommodate the overhead passenger rest cabin.

As noted above, it is contemplated that the overhead passenger rest cabin will not be occupied by passengers during any flight segment, or under any conditions, where immediate evacuation of the aircraft may be necessary (e.g., TTL phases or periods of excessive turbulence or other adverse environmental conditions). Accordingly, the overhead passenger rest cabin may be equipped with bi-directional hatches deployable into an aisle of the main cabin. For example, should conditions within the overhead cabin warrant the evacuation of passengers or the rapid intervention of cabin crew, the bi-directional hatches may include access ladders that deploy downward into the main cabin. Passengers may rapidly exit the overhead cabin, and cabin crew may likewise rapidly ascend into the overhead cabin, via the access ladders. Bi-directional hatches may be easily deployable by passengers; e.g., a single lever or button may release the access ladder from its restraints while activating any necessary emergency lights or warnings.

The overhead passenger rest cabins, as noted above, may incorporate individual rest compartments situated along either side of a central corridor and accessible therefrom. It is contemplated that due to the limited interior space available for incorporating the overhead passenger rest cabin into an aircraft interior while minimally intruding upon main cabin space, the central access corridor may be of limited height, such that passengers of average size may not be able to traverse the access corridor without crouching to some extent. Accordingly, the central access corridor may incorporate handholds at regular intervals therealong, sized and placed to reduce strain associated with remaining in a crouched position while traversing the corridor. Similarly, the access corridor may include shifts in lighting or ventilation along its length to prevent claustrophobia; transitional spaces may be positioned along the corridor to "break up" the space.

Similarly to the overhead crown rest cabin, the lower lobe rest cabins may be modular in nature. For example, the lower lobe rest cabins may be sized and shaped to match the proportions of a cargo container, such that one or more such rest cabins may be easily incorporated into the lower cargo deck. The modular rest cabins may likewise include dedicated entry and exit portals and electrical, airflow, and other service connections therebetween, such that the overall amount of available lower lobe bunk space may be scaled up or down as needed or desired. For example, passengers may descend into a first lower lobe rest cabin, which may include transitional space and/or temporary crew seating facilities, and pass therefrom into successive rest cabins through the entry and exit portals. Lower lobe rest cabins may include additional ceiling hatches deployable if rapid evacuation of the rest cabins upward into the main cabin is necessary. In some embodiments, lower lobe rest cabins may include modular pairs of interconnected rest cabins. For example, a first cabin and a second cabin may be interconnected such that a first space within the first cabin and a second adjoining space within the second cabin may be combined into a full size rest compartment or bunk shared between the two cabins, where neither the first space nor the second space would alone be large enough to accommodate a full rest compartment.

Additionally, or alternatively, embodiments of the inventive concepts disclosed herein are directed to a passenger aircraft incorporating additional reserved spaces adjacent to, and accessible from, selected lay-flat or tracked aircraft seats. For example, first-class, business-class, or equivalent passengers may be assigned main-deck seats capable of tracking backward or forward, or of reconfiguration into a lay-flat state whereon the passenger may occupy the seat in a prone position. Such lay-flat seats or tracking mechanisms may conceal a hatch set into the main deck floor, whereby the occupying passenger may access a private or semi-private compartment, e.g., on the cargo deck immediately below the main deck. Said private or semi-private compartment (e.g., two adjacent seats may share a compartment) may provide an alternative seating area or bunk area for the passenger while preserving available space on the main deck for other seating facilities; compartments may be windowless but equipped with "virtual windows" as described above.

FIG. 1—Aircraft Layout, Generally

Referring to FIG. 1, an exemplary embodiment of a passenger aircraft 100 according to the inventive concepts disclosed herein may include overhead passenger rest cabins 102 and lower lobe passenger rest cabins 104. For example, the aircraft 100 may include only overhead passenger rest cabins 102, only lower lobe passenger rest cabins 104, or both. Overhead passenger rest cabins 102 may be incorporated into the overhead crown area of the aircraft 100, above the main passenger cabin 106 (e.g., main deck) and the passenger seats (108), overhead bins (110), and monuments (112) (e.g., storage monuments, galley monuments, audiovisual monuments housing an inflight entertainment system, lavatories). Lavatories, monuments 112, zone dividers, or other structures proximate to the longitudinal center of the main passenger cabin 106 may be notched or otherwise modified to accommodate the overhead passenger rest cabin 102. Similarly, lower lobe passenger rest cabins 104 may be incorporated on a cargo deck directly underneath the main passenger cabin 106. Passengers may access the overhead passenger rest cabins 102 or lower lobe passenger rest cabins 104 via an entry vestibule (114) located within the main passenger cabin 106.

The entry vestibule 114 may connect the overhead passenger rest cabins 102 and the lower lobe passenger rest cabins 104 (when both are incorporated within the aircraft 100) while providing a separate path for passengers to access each rest cabin from the main passenger cabin 106 (e.g., via ascending or descending staircases). It is contemplated that the entry vestibule 114 will be the primary means of passenger access to the overhead passenger rest cabins 102 and the lower lobe passenger rest cabins 104, and the sole means of access during non-emergency conditions. In some embodiments, the entry vestibule 114 may be located at the aft end of the overhead passenger rest cabin 102, and an auxiliary vestibule (114a) may provide a secondary entrance and exit to and from the main passenger cabin 106 and the overhead passenger rest cabin 102. The overhead passenger rest cabins 102 may include additional escape hatches (not shown) providing an emergency escape route (e.g., to main aisles (116) of the main passenger cabin 106) for passengers to rapidly exit the overhead passenger rest cabins. The lower lobe passenger rest cabins 104 may similarly include escape hatches for emergency return to the main passenger cabin 106. In some embodiments, the aircraft 100 may incorporate additional lower lobe rest compartments (118) situated on the lower cargo deck. For example, the additional lower lobe rest compartments may be located substantially underneath selected partitioned premium seats (120) or premium compartments (122) in premium seating sections of the aircraft 100 and accessible to the occupants of said premium seats or premium compartments (e.g., during safe cruising segments) via proximate hatches in the main deck floor.

FIG. 2—Relative Cabin Proportions

Referring to FIG. 2, the passenger aircraft 100a may be implemented and may function similarly to the aircraft 100 of FIG. 1, except that the aircraft 100a may include an overhead passenger rest cabin 102 and a lower lobe passenger rest cabin 104 connected by an entry vestibule 114 to the main passenger cabin 106. For example, the overhead passenger rest cabin 102 may be incorporated into remote space above the main passenger cabin 106 such that the floor of the central corridor (124) of the overhead passenger rest cabin corresponds substantially to the ceiling of the main passenger cabin 106 (e.g., over the centermost portion of the main cabin). The height of the overhead passenger rest cabin 102 that a passenger (126) of average height may remain comfortably standing, e.g., in a main aisle (118, FIG. 1) of the main passenger cabin. However, space limitations within the aircraft 100a may require passengers (126a-b) respectively traversing the overhead passenger rest cabin 102 and lower lobe passenger rest cabin 104 to do so in a partially crouched position. The overhead passenger rest cabin 102 may include individual passenger rest compartments (128) or bunks extending along either side of the central corridor 124, substantially parallel to the longitudinal or roll axis of the aircraft 100a. The overhead passenger rest cabin 102 may include a transitional space (130) between the entry vestibule 114 and the central corridor 124; the transitional space may include emergency equipment storage (132) and an emergency handset (134) for communicating with the cockpit or cabin crew, or additional steps (130a) linking the entry vestibule and the central corridor. Similarly, the lower lobe passenger rest cabin 104 may incorporate individual passenger rest compartments 128 aligned substantially parallel to the roll axis as well as passenger rest compartments (128a) aligned at an angle to the roll axis, e.g., perpendicular to the roll axis or substantially parallel to the pitch axis of the aircraft 100a.

Figure 3A:
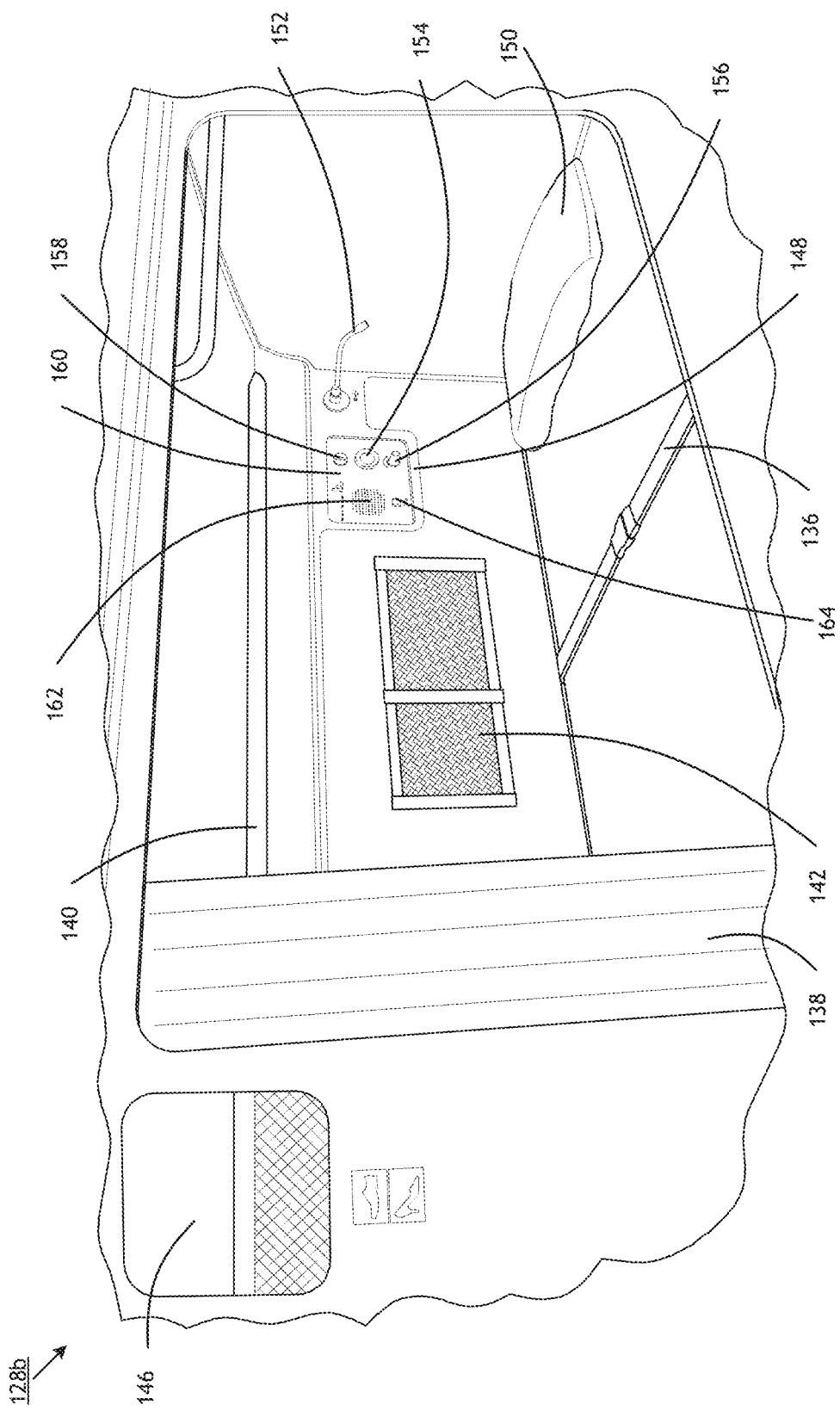
FIG. 3A shows a head-end isometric view of a passenger rest compartment of the aircraft of FIG. 1.
Figure 3B:
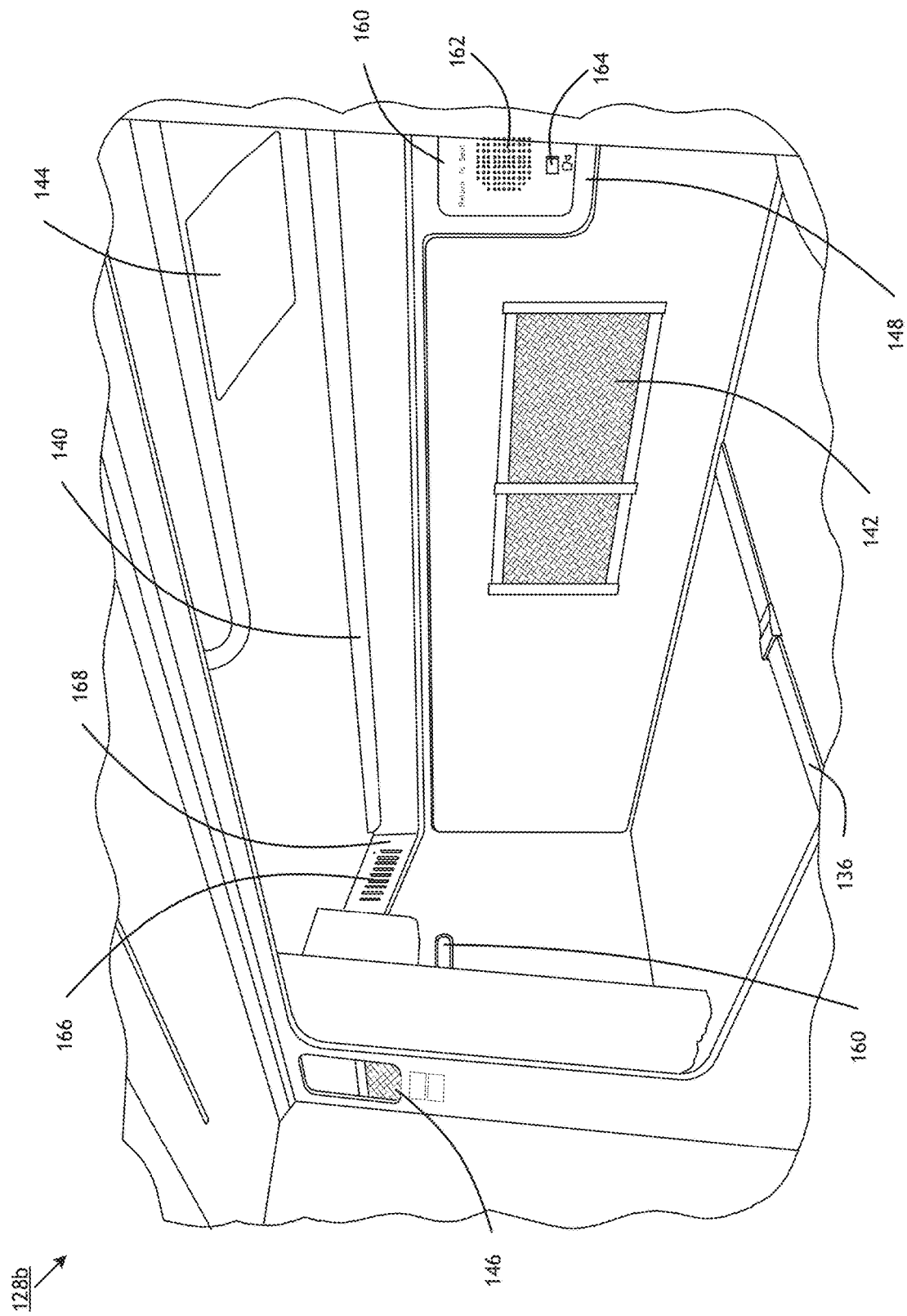
FIG. 3B shows a foot-end isometric view of a passenger rest compartment of the aircraft of FIG. 1.

Referring to FIGS. 3A and 3B, the passenger rest compartment 128b (bunk) may be implemented and may function similarly to the passenger rest compartments 128, 128a of FIG. 2, except that the passenger rest compartment 128b may include a safety belt 136, a privacy partition 138 (e.g., privacy curtain), ambient lighting 140, interior stowage compartments 142, an emergency oxygen drop 144, ventilated shoe stowage compartments 146 (which may, for example, be situated or accessed immediately outside or adjacent to the rest compartment), and a passenger service unit 148 (PSU). For example, the PSU 148 may be positioned proximate to the head end of the rest compartment 128b (e.g., where a pillow 150 may be provided for the passenger's head). The PSU 148 may include a positionable reading light 152 and gasper outlet 154, temperature controls 156, a crew call button 158, lighted signage 160 (e.g., signaling the occupying passenger to return to his/her seat, fasten his/her safety belt 136, no smoking). The PSU may further include a speaker/microphone 162 and call button 164 allowing two-way audio communication between the occupying passenger and the cabin crew. Referring in particular to FIG. 3B, the foot end of the passenger rest compartment 128b may include an air return 166 and infrared sensors 168.

Figure 4:
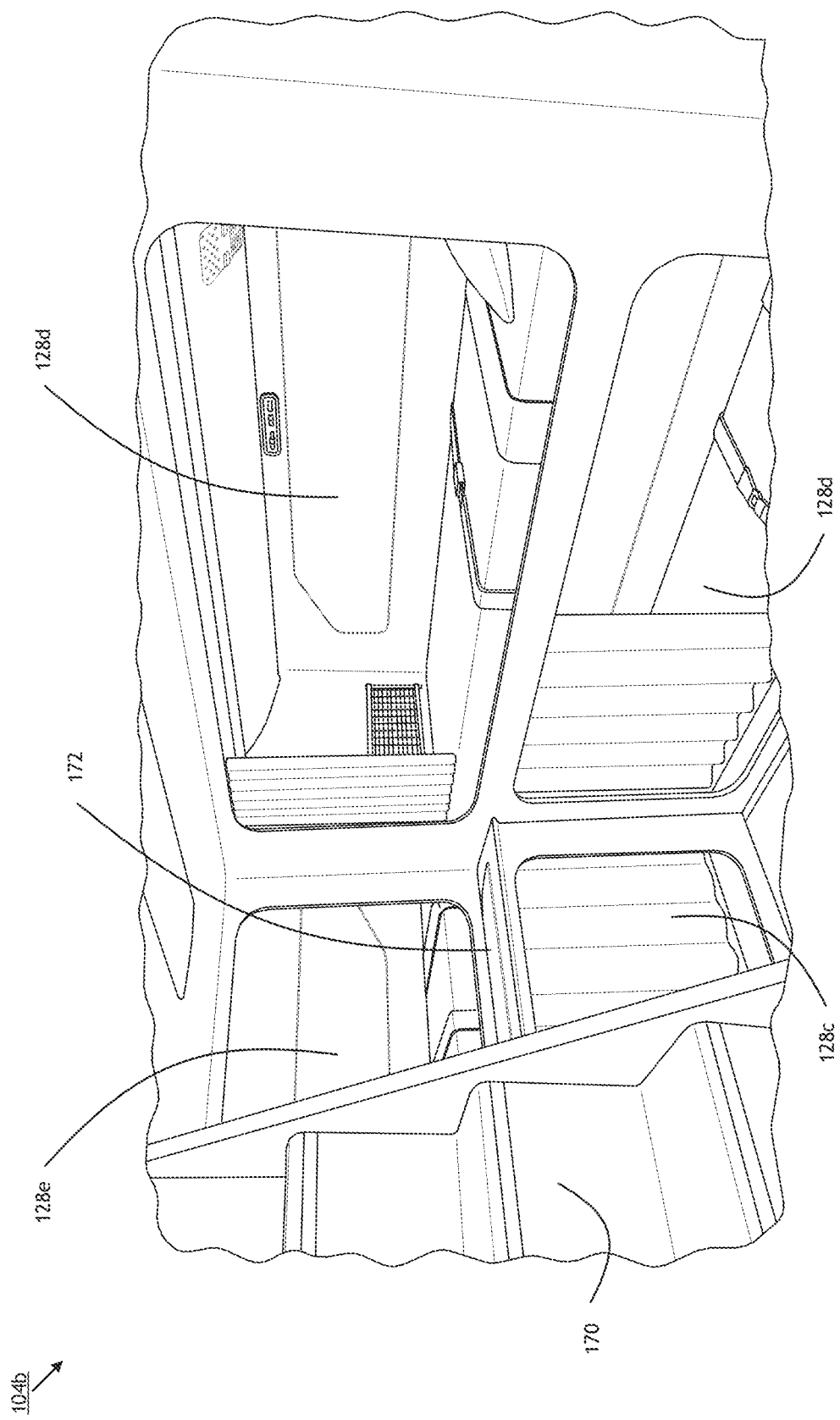
FIG. 4 shows a partial isometric view of a lower lobe passenger rest cabin of the aircraft of FIG. 1.

FIG. 4—Lower Lobe Cabin Layout

Referring to FIG. 4, the lower lobe passenger rest cabin 104b may be implemented and may function similarly to the lower lobe passenger rest cabin 104 of FIG. 2, except that the lower lobe passenger rest cabin 104b may be accessed by a descending staircase (170) connecting the lower lobe passenger rest cabin to the entry vestibule (114, FIG. 2) and thereby to the main passenger cabin (106, FIG. 2). For example, the staircase 170 may descend into the center of the lower lobe passenger rest cabin 104b at a predetermined angle. The passenger rest compartments 128c-e may be implemented and may function similarly to the passenger rest compartments 128b of FIGS. 3A/B, except that the passenger rest compartments 128c, 128 e and the passenger rest compartment 128d may be respectively oriented substantially parallel or at an angle to (e.g., substantially perpendicular to) the longitudinal/roll axis of the aircraft (100, FIG. 1) and positioned around the perimeter of the lower lobe passenger rest cabin 104b. The passenger rest compartments 128d may be positioned in substantially vertical stacks of two or more bunks, depending on the height of the bunks relative to the height of the lower lobe passenger rest cabin 104b. The passenger rest compartment 128e, for example, may be stacked atop the passenger rest compartment 128c in a staggered fashion, set back from the passenger rest compartment 128 by a shelf (172). For example, the passenger rest compartment 128e may combine space from two adjacent modular lower lobe passenger rest cabins 104b, where neither rest cabin on its own may include sufficient space for a full passenger rest compartment. Lower lobe passenger rest cabins 104, 104a may be proportioned for a form factor compatible with standard cargo containers; individual lower lobe passenger rest cabins may be palletized or otherwise capable of addition to, or removal from, the aircraft 100 via the existing cargo loading/unloading system. Further, depending on size, configuration, and desired capacity, the aircraft 100 may incorporate lower lobe passenger rest cabins (104a) either forward or aft of the lower lobe passenger rest cabin 104 connected to the main passenger cabin 106 via the entry vestibule 114.

FIG. 5—Overhead Cabin Layout

Referring to FIG. 5, the overhead passenger rest cabin 102a and individual rest compartments 128f may be implemented and may function similarly to the overhead passenger rest cabin 102 of FIG. 2 and the individual rest compartments 128c-e of FIG. 4, except that the individual passenger rest compartments 128f of the overhead passenger rest cabin 102a may be sequentially arranged along either side of the central corridor 124 extending forward (e.g., substantially parallel to the longitudinal/roll axis of the aircraft (100, FIG. 1). For example, the overhead passenger rest cabin 102a may comprise twenty (20) passenger rest compartments 128f: ten compartments on the port side of the central corridor 124 and ten opposite compartments on the starboard side. The transitional space (130, FIG. 2) between the entry vestibule (114, FIG. 2) and the overhead passenger rest cabin 102a may include handles (174) graspable by cabin crew or passengers entering the overhead passenger rest cabin via the entry vestibule. Further, graspable handles (176) may be spaced along the central corridor 124; passengers (126a, FIG. 2) traversing the central corridor (e.g., after entering the overhead passenger rest cabin 102a via the entry vestibule 114 and proceeding to their assigned passenger rest compartment 128f) may use the graspable handles to reduce strain while traversing the central corridor in a crouched position. A crew station 178 may be located at the forward end of the overhead passenger rest cabin 102 (including, e.g., emergency storage for first aid and fire containment supplies, communications facilities, and/or temporary jump seating). Similar crew stations may be located within the transitional space (130, FIG. 2) at the aft end of the overhead passenger rest cabin 102 and throughout the lower lobe passenger rest cabin (104, FIG. 4; e.g., proximate to the staircase or the point at which the entry vestibule 114 enters the lower lobe passenger rest cabin).

Figure 6A:
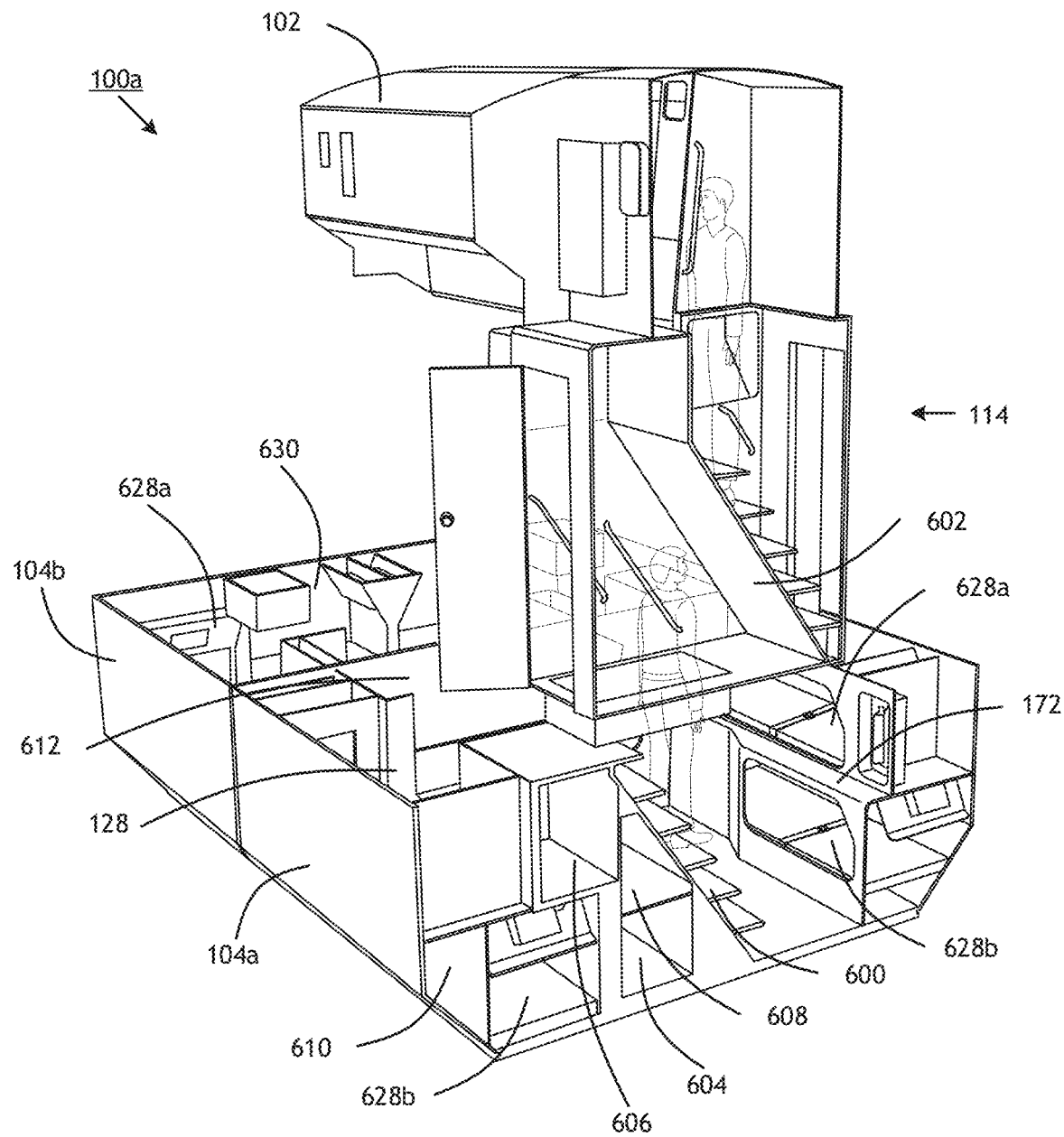
FIG. 6A shows a perspective cutaway view of a vestibule and lower lobe passenger rest cabins according to embodiments of the inventive concepts disclosed herein.

FIG. 6A/B—Concurrent Stair Vestibule Cutaway

Figure 6B:
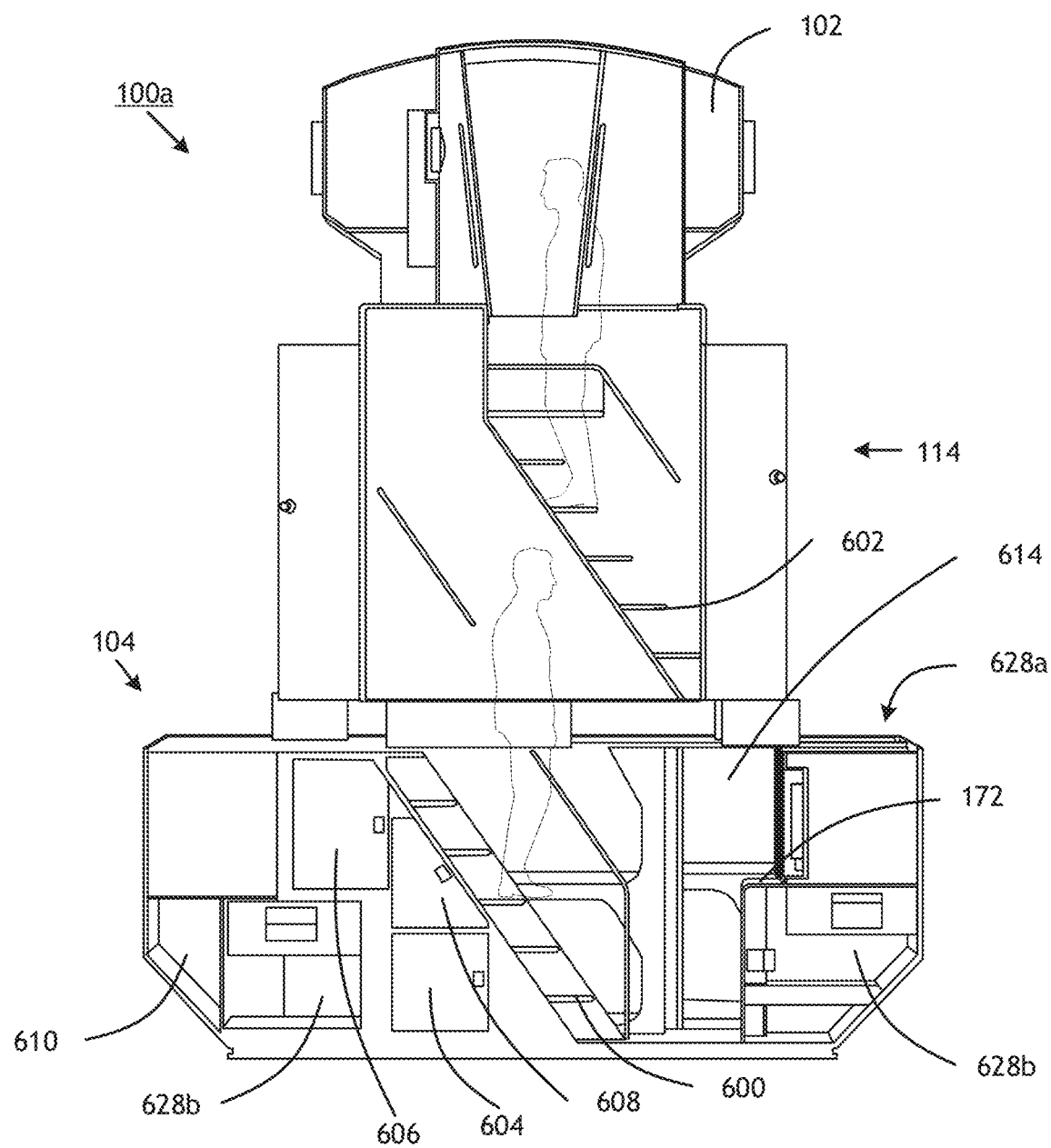
FIG. 6B shows a side cutaway view of a vestibule and lower lobe passenger rest cabins according to embodiments of the inventive concepts disclosed herein.

Referring to FIGS. 6A and 6B, perspective and side cutaway views of a vestibule 114 and lower lobe passenger rest cabins 104a, 104b according to embodiments of the inventive concepts disclosed herein is shown. In at least one embodiment, a system of lower lobe passenger rest cabins 104a, 104b are connected to a main passenger cabin via at least one vestibule 114. An entry lower lobe passenger rest cabin 104a may include a lower lobe staircase 600 disposed to allow access to the entry lower lobe passenger rest cabin 104a from the main passenger cabin through the vestibule 114.

In at least one embodiment, the vestibule 114 is configured with an overhead passenger rest cabin staircase 602 to allow access to a system of overhead passenger rest cabins 102. The vestibule 114, overhead passenger rest cabins 102 and lower lobe passenger rest cabins 104a, 104b may be oriented such that the staircases 600, 602 are oriented in the same direction but offset vertically. Such configuration allows the vestibule 114 to be substantially the same width as the staircases 600, 602 and occupy the smallest possible width of main passenger cabin space, corresponding to the fewest rows of seating.

The entry lower lobe passenger rest cabin 104a defines a plurality of upper longitudinal passenger rest compartments 628a oriented along the longitudinal (roll) axis of the aircraft. The entry lower lobe passenger rest cabin 104a may also define a plurality of lower longitudinal passenger rest compartments 628b oriented along the longitudinal axis of the aircraft wherein the upper and lower longitudinal passenger rest compartments 628a, 628b are offset from each other toward the longitudinal axis of the aircraft to provide substantially equal width within a space defined by a module configured to fit within a cargo compartment. The longitudinal offset may result in a shelf 172 associated with the upper longitudinal passenger rest compartments 628a that functions as a non-obtrusive hand-hold for passengers navigating the lower lobe passenger rest cabins 104a, 104b. Furthermore, longitudinal offset may define a utility space 610. The utility space 610 may comprise an unenclosed void for running utility conduits or include interfaces for securely connecting aircraft utility components (such as ventilation, data and power cables, and other items necessary for control of the aircraft) between the aircraft and the system of lower lobe passenger rest cabins 104a, 104b. The utility space 610 may shield safety critical components and/or provide interfaces for safety critical components to pass through. Lower lobe passenger rest cabins 104a, 104b may include mechanisms for segregating the environment of the lower lobe passenger rest cabins 104a, 104b from the cargo deck. For example, gaskets or boots may be disposed between adjacent lower lobe passenger rest cabins 104a, 104b to create an airtight and noise dampening seal 706. Such mechanisms may also be specifically directed to portions of the lower lobe passenger rest cabins 104a, 104b including ventilation and data and power cables to create an airtight and noise dampening seal 706 in the vicinity of opening for utility conduits and components. In at least one embodiment, the mechanisms for segregating the environment may be configured to prevent any fire suppression elements from the cargo deck from intruding into the lower lobe passenger rest cabins 104a, 104b.

In at least one embodiment, the upper and lower longitudinal passenger rest compartments 628a, 628b may also be offset along the longitudinal axis such that a passenger in an upper longitudinal passenger rest compartment 628a are not directly above a passenger in any lower longitudinal passenger rest compartment 628b. Such offset may facilitate entry and exit, either in normal operation or during evacuation. Furthermore, such offset may place bulkheads separating lower longitudinal passenger rest compartment 628b at a mid-point of a corresponding upper longitudinal passenger rest compartment 628a to provide support when a passenger is in the upper longitudinal passenger rest compartment 628a. Where a longitudinal offset it used, some upper or lower longitudinal passenger rest compartments 628a, 628b may not be entirely defined by a single entry lower lobe passenger rest cabin 104a or connected lower lobe passenger rest cabins 104b. In those cases, each of the entry lower lobe passenger rest cabin 104a and connected lower lobe passenger rest cabins 104b may define a portion of the corresponding upper or lower longitudinal passenger rest compartments 628a, 628b that align when the system of lower lobe passenger rest cabins 104a, 104b are in place and connected to define the entire longitudinal passenger rest compartment 628a, 628b.

Each entry lower lobe passenger rest cabin 104a and connected lower lobe passenger rest cabin 104b may be defined by bulkheads 612 including transitional openings 614 that allow transit between longitudinal passenger rest compartments 628a, 628b. Such transitional openings 614 may be aligned such that any number of modular lower lobe passenger rest cabins 104a, 104b may be connected according to passenger need and cargo space allowance.

In at least one embodiment, the entry lower lobe passenger rest cabin 104a and any connected lower lobe passenger rest cabins 104b define one or more angled passenger rest compartments 630 oriented along the pitch axis of the aircraft. Angled passenger rest compartments 630 may also be stacked vertically to increase passenger density.

In at least one embodiment, each lower lobe passenger rest cabin 104a, 104b defines stowage compartments 604, 606, 608. Stowage compartments 604, 606, 608 may be specific to one or more passenger rest compartments 628a, 628b, 630 or dedicated to crew usage or communal passenger usage. Furthermore, such stowage compartments 604, 606, 608 may conform to standards for stowing specific passenger safety devices.

Figure 7A:
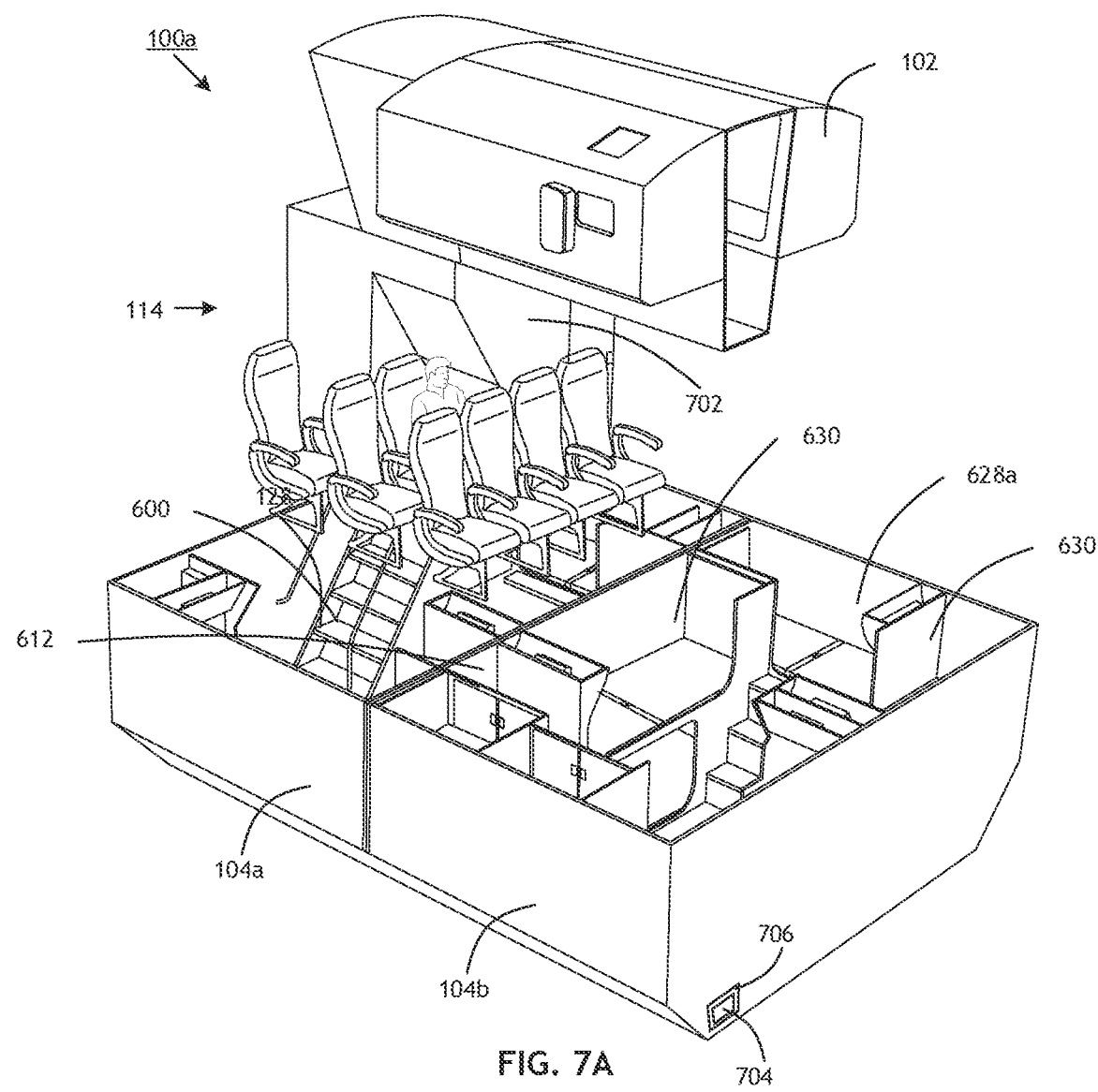
FIG. 7A shows a perspective cutaway view of a vestibule and lower lobe passenger rest cabins according to embodiments of the inventive concepts disclosed herein.

FIG. 7A/B—Opposing Stair Vestibule Cutaway

Figure 7B:
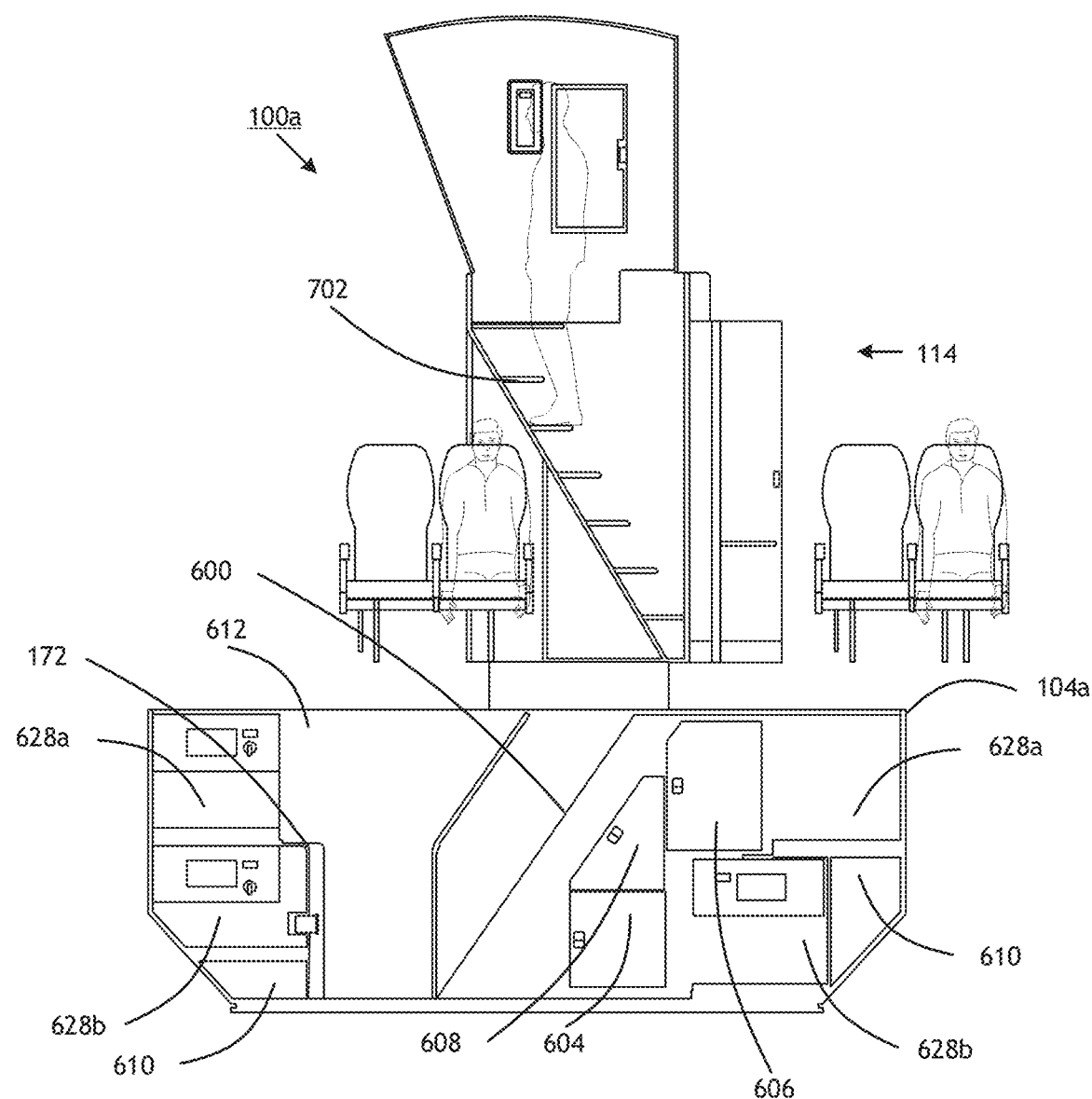
FIG. 7B shows a side cutaway view of a vestibule and lower lobe passenger rest cabins according to embodiments of the inventive concepts disclosed herein.

Referring to FIGS. 7A and 7B, perspective and side cutaway views of a vestibule 114 and lower lobe passenger rest cabins 104a, 104b according to embodiments of the inventive concepts disclosed herein is shown. In at least one embodiment, a system of lower lobe passenger rest cabins 104a, 104b are connected to a main passenger cabin via at least one vestibule 114. An entry lower lobe passenger rest cabin 104a may include a lower lobe staircase 600 disposed to allow access to the entry lower lobe passenger rest cabin 104a from the main passenger cabin through the vestibule 114.

In at least one embodiment, the vestibule 114 is configured with an overhead passenger rest cabin staircase 702 to allow access to a system of overhead passenger rest cabins 102. The vestibule 114, overhead passenger rest cabins 102 and lower lobe passenger rest cabins 104a, 104b may be oriented such that the staircases 600, 702 are oriented in opposing direction but offset laterally. Such configuration allows the vestibule 114 to displace the fewest number of seats in whichever rows it occupies.

The entry lower lobe passenger rest cabin 104a defines a plurality of upper longitudinal passenger rest compartments 628a oriented along the longitudinal (roll) axis of the aircraft. The entry lower lobe passenger rest cabin 104a may also define a plurality of lower longitudinal passenger rest compartments 628b oriented along the longitudinal axis of the aircraft wherein the upper and lower longitudinal passenger rest compartments 628a, 628b are offset from each other toward the longitudinal axis of the aircraft to provide substantially equal width within a space defined by a module configured to fit within a cargo compartment. The longitudinal offset may result in a shelf 172 associated with the upper longitudinal passenger rest compartments 628a that functions as a non-obtrusive hand-hold for passengers navigating the lower lobe passenger rest cabins 104a, 104b. Furthermore, longitudinal offset may define a utility space 610. The utility space 610 may comprise an unenclosed void for running utility conduits or include interfaces 704 for securely connecting aircraft utility components (such as ventilation, data and power cables, and other items necessary for control of the aircraft) between the aircraft and the system of lower lobe passenger rest cabins 104a, 104b. The utility space 610 may shield safety critical components and/or provide interfaces 704 for safety critical components to pass through.

In at least one embodiment, the upper and lower longitudinal passenger rest compartments 628a, 628b may also be offset along the longitudinal axis such that a passenger in an upper longitudinal passenger rest compartment 628a are not directly above a passenger in any lower longitudinal passenger rest compartment 628b. Such offset may facilitate entry and exit, either in normal operation or during evacuation. Furthermore, such offset may place bulkheads separating lower longitudinal passenger rest compartment 628b at a mid-point of a corresponding upper longitudinal passenger rest compartment 628a to provide support when a passenger is in the upper longitudinal passenger rest compartment 628a. Where a longitudinal offset it used, some upper or lower longitudinal passenger rest compartments 628a, 628b may not be entirely defined by a single entry lower lobe passenger rest cabin 104a or connected lower lobe passenger rest cabins 104b. In those cases, each of the entry lower lobe passenger rest cabin 104a and connected lower lobe passenger rest cabins 104b may define a portion of the corresponding upper or lower longitudinal passenger rest compartments 628a, 628b that align when the system of lower lobe passenger rest cabins 104a, 104b are in place and connected to define the entire longitudinal passenger rest compartment 628a, 628b.

Each entry lower lobe passenger rest cabin 104a and connected lower lobe passenger rest cabin 104b may be defined by bulkheads 612 including transitional openings 614 that allow transit between longitudinal passenger rest compartments 628a, 628b. Such transitional openings 614 may be aligned such that any number of modular lower lobe passenger rest cabins 104a, 104b may be connected according to passenger need and cargo space allowance.

In at least one embodiment, the entry lower lobe passenger rest cabin 104a and any connected lower lobe passenger rest cabins 104b define one or more angled passenger rest compartments 630 oriented along the pitch axis of the aircraft. Angled passenger rest compartments 630 may also be stacked vertically to increase passenger density.

Figure 8:
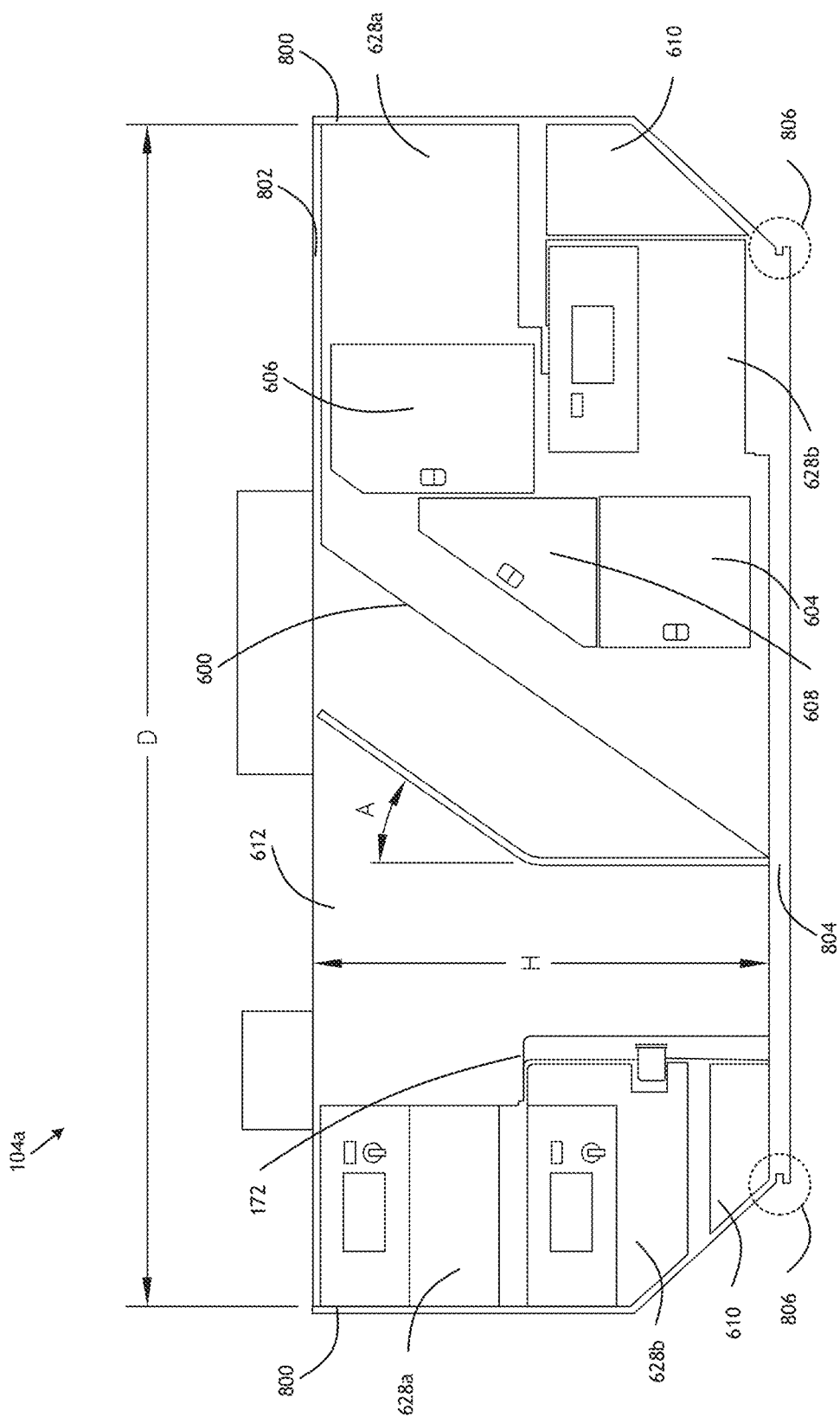
FIG. 8 shows a side view of a lower lobe passenger rest cabin according to embodiments of the inventive concepts disclosed herein.

FIG. 8—Lower Lobe Passenger Compartment

Referring to FIG. 8, a side view of a lower lobe passenger rest cabin according to embodiments of the inventive concepts disclosed herein is shown. A lower lobe passenger rest cabin, such as, but not limited to, an entry lower lobe passenger rest cabin 104a, is defined by a plurality of sidewalls 800 configured to generally conform to the internal walls of a cargo deck of an aircraft, a ceiling portion 802 which may define an entry point in an entry lower lobe passenger rest cabin 104a, and a floor portion 804. Lower lobe passenger rest cabins 104a may generally conform to and be compatible with an air cargo system and unit load devices such that individual lower lobe passenger rest cabins 104a may be loaded via a cargo handling system similarly to cargo containers or pallets; potentially alongside such cargo containers or pallets.

In at least one exemplary but not limiting embodiment, the defined space may be approximately 153.66 centimeters high (H=60.5 inches) and 406 centimeters wide (D=160 inches). In an entry lower lobe passenger rest cabin 104a, the lower lobe staircase 600 and corresponding railings may be disposed at a 35° angle (A=35°).

In at least one embodiment, each lower lobe passenger rest cabin includes wireless data communication elements to minimize the complexity of data connections. Each lower lobe passenger rest cabin connected in a system of lower lobe passenger rest cabins in an aircraft would comprise a node in a network for sharing data about the state of each passenger rest compartment 628a, 630, (628b obscured).

In at least one embodiment, the floor portion 804 defines one or more aircraft engagement features 806 configured to engage a portion of the aircraft cargo deck to generally align the lower lobe passenger rest cabin with other features of the aircraft (such as a vestibule) and with other lower lobe passenger rest cabins to ensure that passageways between the lower lobe passenger rest cabins and utility features are properly aligned. For example, data connections and power connections between the lower lobe passenger rest cabins. The aircraft engagement features 806 may also secure the lower lobe passenger rest cabins in place and prevent undesirable lateral movement.

In at least one embodiment, the floor portion 804 is flat and defines a space beneath the floor portion 804 for aircraft critical utility elements such electrical or electronic components, or hydraulic components.

Figure 9A:
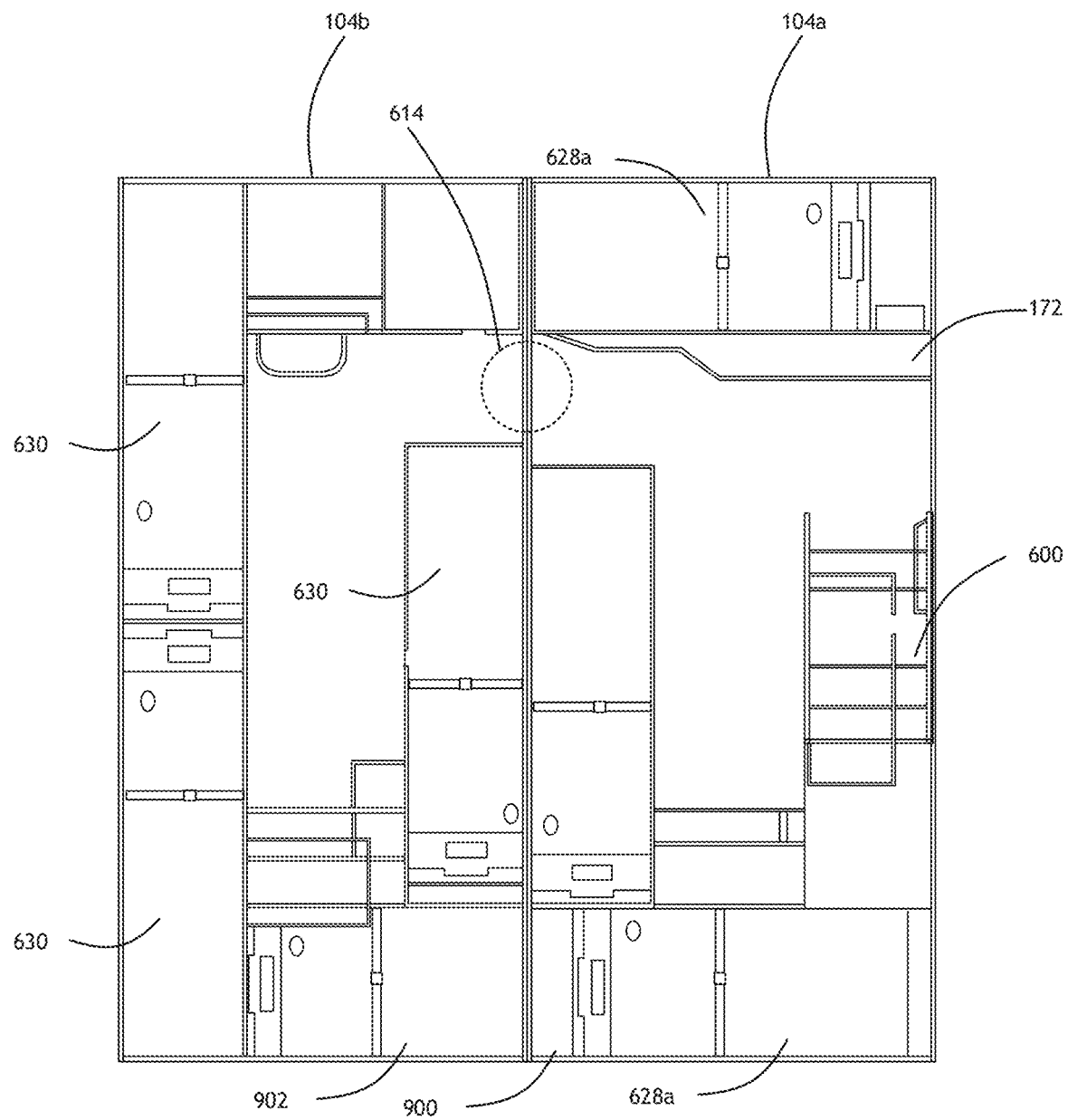
FIG. 9A shows a top view of a system of lower lobe passenger rest cabins according to embodiments of the inventive concepts disclosed herein.

FIG. 9A/B/C—Lower Lobe Compartments

Figure 9B:
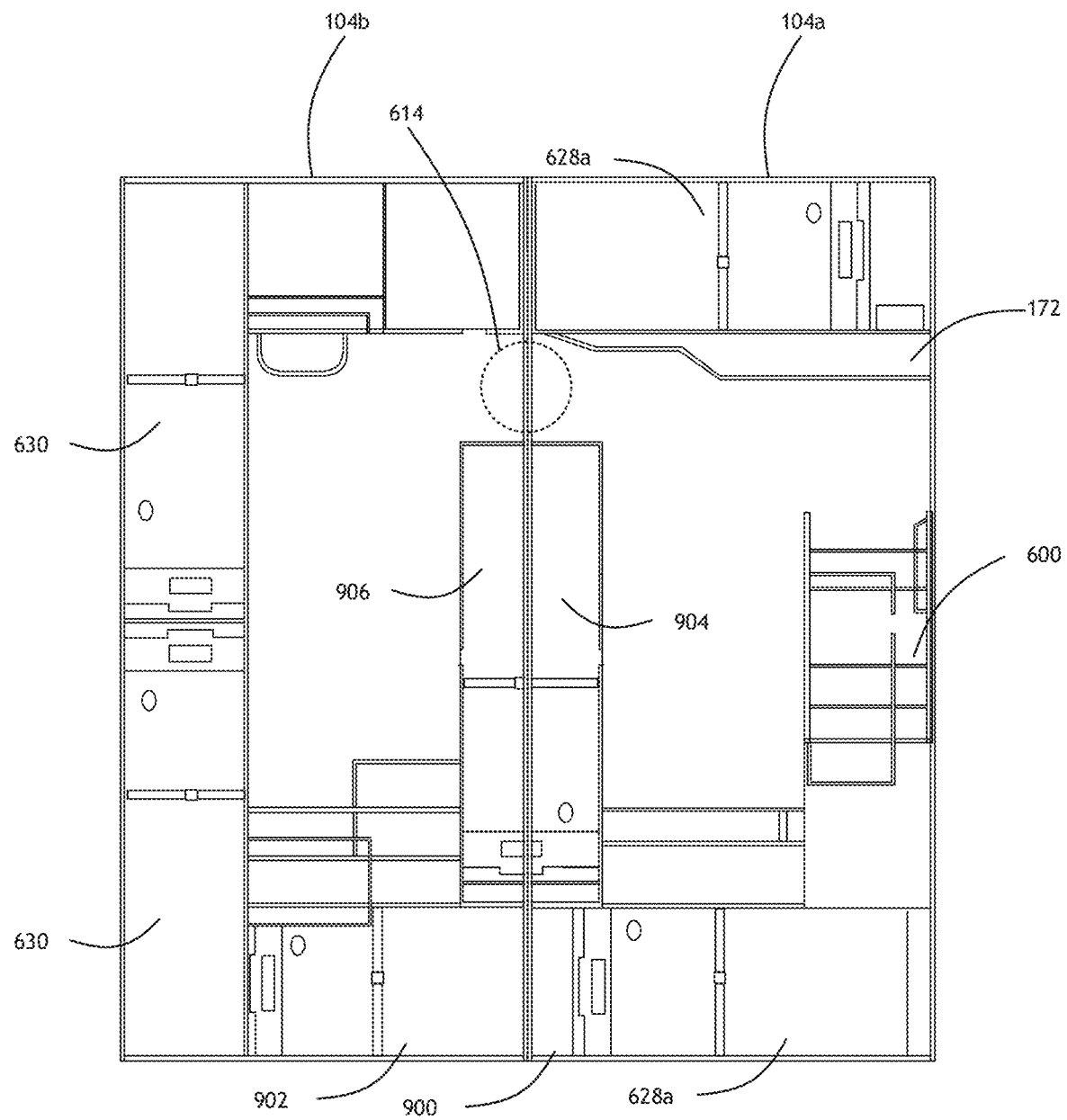
FIG. 9B shows a top view of a system of lower lobe passenger rest cabins according to embodiments of the inventive concepts disclosed herein.
Figure 9C:
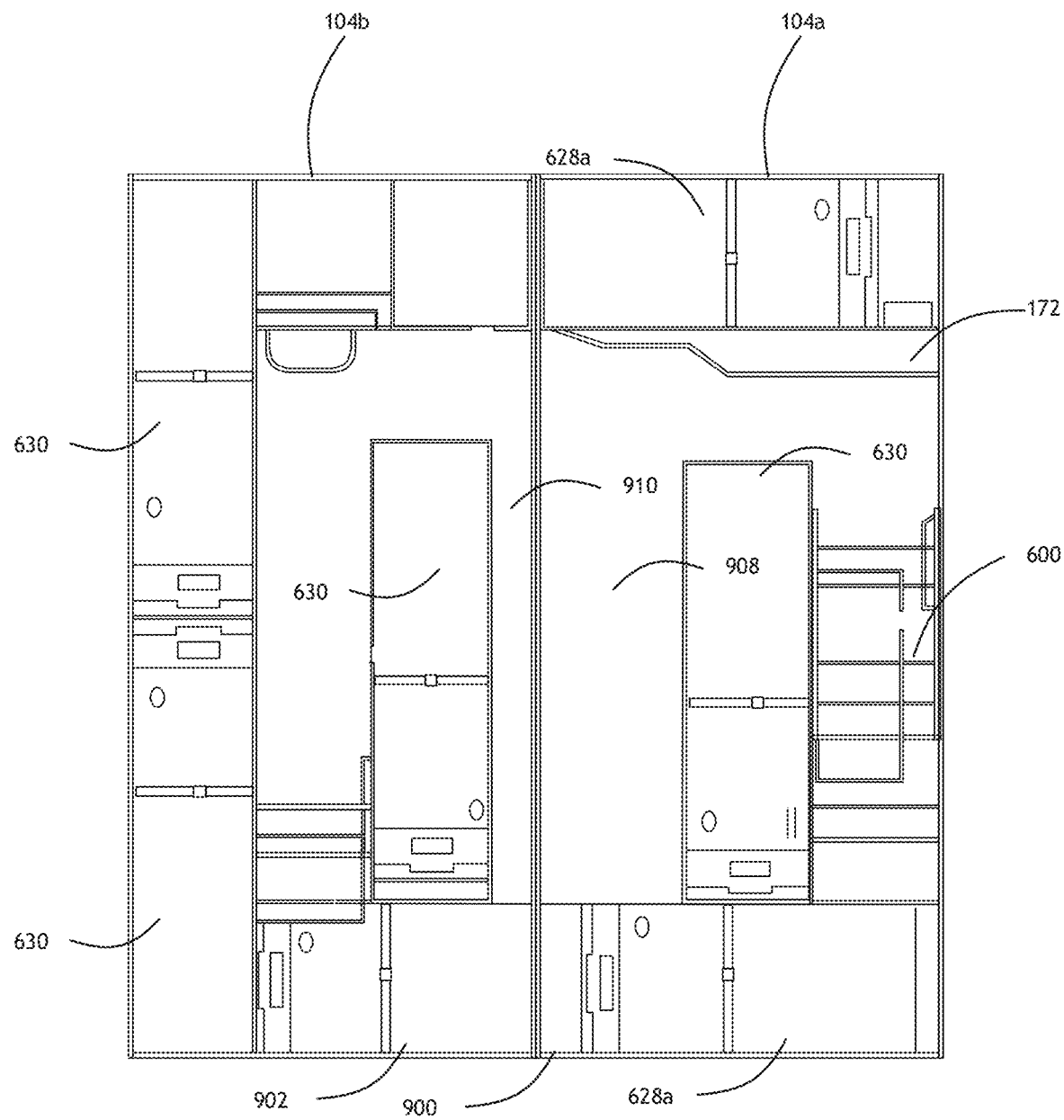
FIG. 9C shows a top view of a system of lower lobe passenger rest cabins according to embodiments of the inventive concepts disclosed herein.

Referring to FIGS. 9A, 9B, and 9C, top views of a system of lower lobe passenger rest cabins 104a, 104b according to embodiments of the inventive concepts disclosed herein are shown. Each lower lobe passenger rest cabins 104a, 104b comprises longitudinal passenger rest compartments 628a and angled passenger rest compartments 630. The lower lobe passenger rest cabins 104a, 104b are connected via at least one transitional opening 614.

Referring to FIG. 9A, the configuration and disposition of passenger rest compartments 628a, 630 may be incompatible with lower lobe passenger rest cabins 104a, 104b having a size and shape corresponding to a cargo container. For increased passenger density, each of a first lower lobe passenger rest cabin (such as an entry lower lobe passenger rest cabin 104a) and second lower lobe passenger rest cabin (such as a connected lower lobe passenger rest cabin 104b) defines a portion of a passenger rest compartment. For example, the entry lower lobe passenger rest cabin 104a defines a first portion 900 of an upper longitudinal passenger rest compartment while the connected lower lobe passenger rest cabin 104b defines a second portion 902 of the upper longitudinal passenger rest compartment.

FIG. 9A illustrates an exemplary embodiment having one entry lower lobe passenger rest cabin 104a and one connected lower lobe passenger rest cabin 104b. In at least one embodiment, connected lower lobe passenger rest cabins 104b may be modular and interconnectable. Each connected lower lobe passenger rest cabin 104b would define opposing, closeable transitional openings 614 to create a hallway through the lower lobe passenger rest cabins 104a, 104b.

In at least one embodiment, each lower lobe passenger rest cabin 104a, 104b includes fire detection elements. For example, each passenger rest compartment 628a, 630 may include infrared or other heat sensors, or sensors configured for detecting smoke; the corresponding lower lobe passenger rest cabins 104a, 104b may include a processing element configured to identify heat indicative of a fire via the passenger rest compartment sensors and communicate a warning to the cabin crew.

Referring to FIG. 9B, a first lower lobe passenger rest cabin defines a first portion 904 of an angled passenger rest compartment while a second lower lobe passenger rest cabin defines a second portion 906 of the angled passenger rest compartment. In such embodiment, the first portion 904 and second portion 906 define a complete angled passenger rest compartment when the lower lobe passenger rest cabins 104a, 104b are installed in an aircraft.

Referring to FIG. 9C, a first lower lobe passenger rest cabin defines a first portion 908 of an aisle while a second lower lobe passenger rest cabin defines a second portion 910 of the aisle. In such embodiment, the first portion 908 and second portion 910 define a complete aisle when the lower lobe passenger rest cabins 104a, 104b are installed in an aircraft.

Figure 10:
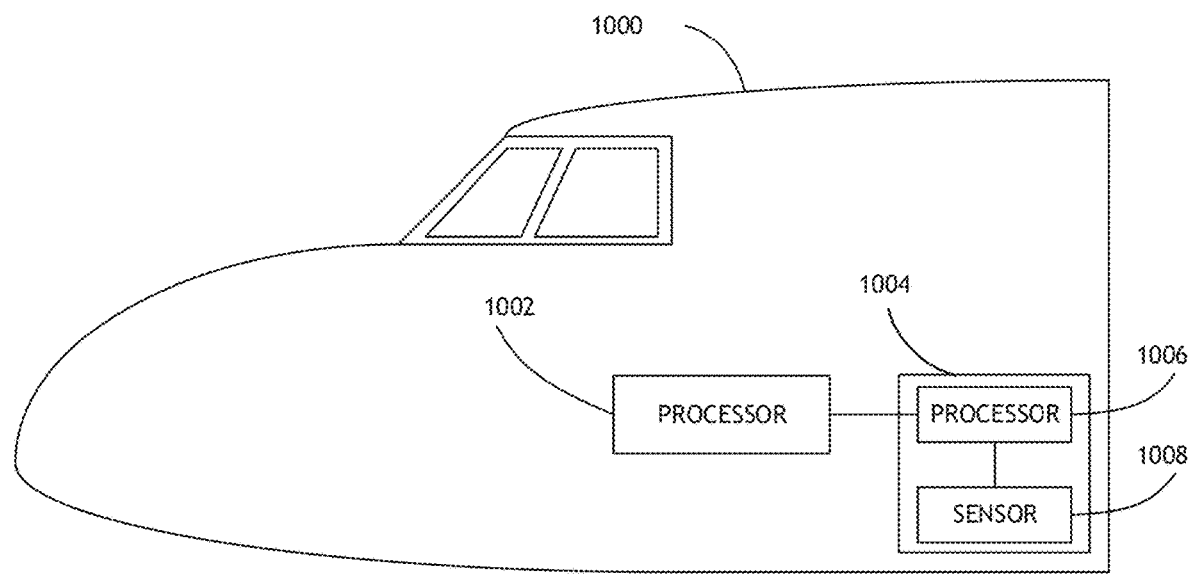
FIG. 10 shows a block environmental view of an aircraft with a system of lower lobe passenger rest cabins according to embodiments of the inventive concepts disclosed herein.

FIG. 10—Fire Detection

Referring to FIG. 10, a block environmental view of an aircraft 1000 with a system of lower lobe passenger rest cabins 1004 according to embodiments of the inventive concepts disclosed herein is shown. Each lower lobe passenger rest cabin 1004 includes heat/fire detection sensors 1008. Where the sensors 1008 detect a heat signature indicative of a potential file, a cabin processor 1006 may communicate such detection to a cabin crew station 1002 where a crew member may take action as necessary.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A modular lower lobe passenger rest cabin comprising:
one or more exterior cameras;
at least one longitudinally oriented passenger rest compartment configured to accommodate a passenger of an aircraft in a substantially prone position, each of the at least one longitudinally oriented passenger rest compartments comprising a display surface in data communication with the one or more exterior cameras to provide a virtual window;
at least one partial passenger rest compartment, each of the at least one partial passenger rest compartments comprising a display surface in data communication with the one or more exterior cameras to provide a virtual window, and each of the at least one partial passenger rest compartments defining a portion of a longitudinal passenger rest compartment; and
at least one angled passenger rest compartment configured to accommodate a passenger of an aircraft in a substantially prone position, each of the at least one angled passenger rest compartments comprising a display surface in data communication with the one or more exterior cameras to provide a virtual window,
wherein:
the at least one partial passenger rest compartment is disposed to align with a partial passenger rest compartment of a second modular lower lobe passenger rest cabin such that a first portion of a longitudinal passenger rest compartment of one partial passenger rest compartment and a second portion of a longitudinal passenger rest compartment of a partial passenger rest compartment of the second modular lower lobe passenger rest cabin to form a complete longitudinal passenger rest compartment; and
the modular lower lobe passenger rest cabin is configured for disposition within a cargo handling system of an aircraft.

2. The modular lower lobe passenger rest cabin of claim 1, further comprising a processor in data communication with a cabin crew station, wherein:
the at least one longitudinally oriented passenger rest compartment includes a heat sensor in data communication with the processor; and
the processor is configured to identify heat above a threshold value indicative of a potential fire via the heat sensor and communicate such identification to the cabin crew station.

3. The modular lower lobe passenger rest cabin of claim 1, further comprising at least one environmental segregation element configured to produce an airtight seal when the modular lower lobe passenger rest cabin is installed adjacent to another modular lower lobe passenger rest cabin.

4. The modular lower lobe passenger rest cabin of claim 1, further comprising at least one lower longitudinally oriented passenger rest compartment configured to accommodate a passenger of an aircraft in a substantially prone position, disposed beneath the longitudinally oriented passenger rest compartment, and linearly offset such that a bulkhead defining a portion of the lower longitudinally oriented passenger rest compartment provides structural support to the longitudinally oriented passenger rest compartment.

5. The modular lower lobe passenger rest cabin of claim 1, wherein:
the modular lower lobe passenger rest cabin defines one or more utility spaces corresponding to one or more of electrical, hydraulic, and ventilation conduits used in normal operation of the aircraft; and the utility spaces are insulated to prevent interference with said conduits by activity within the modular lower lobe passenger rest cabin.

6. The modular lower lobe passenger rest cabin of claim 1, further comprising:

at least one interface disposed on an outside surface, configured to engage an interface of another modular lower lobe passenger rest cabin when installed in the aircraft, the at least one interface providing one or more of electrical power, data communication, or ventilation; and at least one environmental sealing element configured to create an airtight, noise dampening seal around each of the at least one interface.

7. The modular lower lobe passenger rest cabin of claim 6, further comprising one or more aircraft engagement features configured to engage a portion of the aircraft cargo handling system to align the interface with an interface of another modular lower lobe passenger rest cabin.

8. A system of passenger rest cabins comprising:

one or more exterior cameras;

at least one entry lower lobe passenger rest cabin comprising:

at least one passenger rest compartment configured to accommodate a passenger of an aircraft in a substantially prone position, each of the at least one passenger rest compartments comprising a display surface in data communication with the one or more exterior cameras to provide a virtual window; and a first partial passenger rest compartment defining a first portion of a longitudinal passenger rest compartment; and at least one connected lower lobe passenger rest cabin comprising:

at least one passenger rest compartment configured to accommodate a passenger of an aircraft in a substantially prone position, each of the at least one passenger rest compartments comprising a display surface in data communication with the one or more exterior cameras to provide a virtual window; and a second partial passenger rest compartment, the second partial passenger rest compartment comprising a display surface in data communication with the one or more exterior cameras to provide a virtual window, and defining a second portion the longitudinal passenger rest compartment, wherein the first partial passenger rest compartment and the second partial passenger rest compartment are disposed to align such that the first portion of the longitudinal passenger rest compartment and the second portion of the longitudinal passenger rest compartment form a complete longitudinal passenger rest compartment when the system of passenger rest cabins is installed in a cargo handling system an aircraft.

9. The system of claim 8, wherein each of the at least one entry lower lobe passenger rest cabin and at least one connected lower lobe passenger rest cabin further comprises a processor in data communication with a cabin crew station, wherein:

each processor comprises a node in a wireless network of nodes; and each processor is configured to identify heat above a threshold value indicative of a potential fire via one or more heat sensors and communicate such identification to the cabin crew station.

10. The system of claim 8, wherein:

the at least one entry lower lobe passenger rest cabin defines a first portion of an aisle;

the at least one connected lower lobe passenger rest cabin defines a second portion of the aisle; and the first portion of the aisle and second portion of the aisle are disposed to align and form a complete aisle between the at least one entry lower lobe passenger rest cabin and the at least one connected lower lobe passenger rest cabin.

11. The system of claim 8, wherein each of the at least one entry lower lobe passenger rest cabin and at least one connected lower lobe passenger rest cabin defines a sealable transitional opening in at least one exterior bulkhead, each sealable transitional opening configured to align with a sealable transitional opening of another entry lower lobe passenger rest cabin or connected lower lobe passenger rest cabin when installed in the cargo handling system.

12. The system of claim 8, wherein each of the at least one entry lower lobe passenger rest cabin and at least one connected lower lobe passenger rest cabin defines one or more utility spaces corresponding to one or more of electrical, hydraulic, and ventilation conduits used in normal operation of the aircraft; the utility spaces are insulated to prevent interference with said conduits by activity within the modular lower lobe passenger rest cabin; and each of the utility spaces is configured to align when the at least one entry lower lobe passenger rest cabin and at least one connected lower lobe passenger rest cabin are installed in the cargo handling system.

13. The system of claim 8, wherein:

the at least one entry lower lobe passenger rest cabin further comprises at least one interface disposed on an outside surface, configured to provide one or more of electrical power, data communication, or ventilation; and the at least one connected lower lobe passenger rest cabin further comprises at least one interface disposed on an outside surface, configured to provide one or more of electrical power, data communication, or ventilation, wherein the at least one entry lower lobe passenger rest cabin interface is disposed to engage the at least one connected lower lobe passenger rest cabin interface when installed in the cargo handling system.

14. The system of claim 13, wherein each of the at least one entry lower lobe passenger rest cabin and at least one connected lower lobe passenger rest cabin further comprises one or more aircraft engagement features configured to engage a portion of the cargo handling system to align the interfaces.

15. An aircraft comprising:

one or more exterior cameras;

at least one entry lower lobe passenger rest cabin comprising:

at least one passenger rest compartment configured to accommodate a passenger of an aircraft in a substantially prone position, each of the at least one passenger rest compartments comprising a display surface in data communication with the one or more exterior cameras to provide a virtual window; and a first partial passenger rest compartment defining a first portion of a longitudinal passenger rest compartment; and at least one connected lower lobe passenger rest cabin comprising:

at least one passenger rest compartment configured to accommodate a passenger of an aircraft in a substantially prone position, each of the at least one passenger rest compartments comprising a display surface in data communication with the one or more exterior cameras to provide a virtual window; and a second partial passenger rest compartment, the second partial passenger rest compartment comprising a display surface in data communication with the one or more exterior cameras to provide a virtual window, and defining a second portion the longitudinal passenger rest compartment, wherein:

the first partial passenger rest compartment and the second partial passenger rest compartment are disposed to align such that the first portion of the longitudinal passenger rest compartment and the second portion of the longitudinal passenger rest compartment form a complete longitudinal passenger rest compartment when the system of passenger rest cabins is installed in a cargo handling system the aircraft; and the at least one entry lower lobe passenger rest cabin is aligned to a main passenger cabin vestibule configured to provide access to a staircase in the at least one entry lower lobe passenger rest cabin.

16. The aircraft of claim 15, wherein each of the at least one entry lower lobe passenger rest cabin and at least one connected lower lobe passenger rest cabin further comprises a processor in data communication with a cabin crew station, wherein:

each processor is configured to identify heat above a threshold value indicative of a potential fire via one or more heat sensors and communicate such identification to the cabin crew station.

17. The aircraft of claim 15, wherein each of the at least one entry lower lobe passenger rest cabin and at least one connected lower lobe passenger rest cabin defines a sealable transitional opening in at least one exterior bulkhead, each sealable transitional opening configured to align with a sealable transitional opening of another entry lower lobe passenger rest cabin or connected lower lobe passenger rest cabin to define a walkway allowing access to each of the at least one entry lower lobe passenger rest cabin and at least one connected lower lobe passenger rest cabin.

18. The aircraft of claim 15, wherein each of the at least one entry lower lobe passenger rest cabin and at least one connected lower lobe passenger rest cabin defines one or more utility spaces corresponding to one or more of electrical, hydraulic, and ventilation conduits used in normal operation of the aircraft; the utility spaces are insulated to prevent interference with said conduits by activity within the modular lower lobe passenger rest cabin; and each of the utility spaces is configured to align to form a singular insulated utility space.

19. The aircraft of claim 15, wherein:

the at least one entry lower lobe passenger rest cabin further comprises at least one interface disposed on an outside surface, configured to provide one or more of electrical power, data communication, or ventilation; and the at least one connected lower lobe passenger rest cabin further comprises at least one interface disposed on an outside surface, configured to provide one or more of electrical power, data communication, or ventilation, wherein the at least one entry lower lobe passenger rest cabin interface is disposed to engage the at least one connected lower lobe passenger rest cabin interface.

20. The aircraft of claim 19, wherein each of the at least one entry lower lobe passenger rest cabin and at least one connected lower lobe passenger rest cabin further comprises one or more aircraft engagement features configured to engage a portion of the cargo handling system to align the interfaces.

* * * * *